US011496189B2

(12) United States Patent
Levy et al.

(10) Patent No.: US 11,496,189 B2
(45) Date of Patent: Nov. 8, 2022

(54) TECHNIQUES FOR PROCESSING DIGITAL POST DISTORTION USING ADDITIONAL REFERENCE SYMBOLS

(71) Applicant: QUALCOMM Incorporated, San Diego, CA (US)

(72) Inventors: Sharon Levy, Binyamina (IL); Guy Wolf, Rosh Haayin (IL); Igor Gutman, Ramat Gan (IL); Assaf Touboul, Netanya (IL); Ory Eger, Tel Aviv (IL); Noam Zach, Kiryat Ono (IL)

(73) Assignee: QUALCOMM Incorporated, San Diego, CA (US)

(*) Notice: Subject to any disclaimer, the term of this patent is extended or adjusted under 35 U.S.C. 154(b) by 216 days.

(21) Appl. No.: 16/888,566

(22) Filed: May 29, 2020

(65) Prior Publication Data
US 2021/0376890 A1 Dec. 2, 2021

(51) Int. Cl.
*H04W 4/00* (2018.01)
*H04B 7/0456* (2017.01)
(Continued)

(52) U.S. Cl.
CPC ......... *H04B 7/0456* (2013.01); *H04L 5/0048* (2013.01); *H04B 2001/0408* (2013.01)

(58) Field of Classification Search
CPC .......... H04B 7/0456; H04B 2001/0408; H04B 7/0478; H04B 7/0695; H04B 1/0475;
(Continued)

(56) References Cited

U.S. PATENT DOCUMENTS

2007/0086535 A1 4/2007 Wang et al.
2011/0305161 A1* 12/2011 Ekpenyong ........... H04L 5/0048
370/252
(Continued)

FOREIGN PATENT DOCUMENTS

WO WO-2017196398 A1 11/2017

OTHER PUBLICATIONS

International Search Report and Written Opinion—PCT/US2021/030563—ISA/EPO—dated Aug. 17, 2021.

*Primary Examiner* — Helene E Tayong
(74) *Attorney, Agent, or Firm* — Holland & Hart LLP

(57) ABSTRACT

Techniques for wireless communications are described. A communication device may support processing digital post distortion using additional references symbols. For example, the communication device may precode a signal including at least two reference symbols for a single-layer transmission using at least two antenna ports. At least one reference symbol of the at least two reference symbols is associated with at least one data symbol of a data stream. The communication device may estimate, based on the at least two reference symbols, a nonlinearity model of at least two power amplifiers associated with the single-layer transmission, and determine an estimate of a nonlinearity factor of the precoded signal based on the estimated nonlinearity model. As a result, the communication device may eliminate or reduce the nonlinear factor of the precoded signal based on the estimated nonlinearity model of the at least two power amplifiers and the estimated channel impulse response.

44 Claims, 11 Drawing Sheets

(51) Int. Cl.
*H04L 5/00* (2006.01)
*H04B 1/04* (2006.01)

(58) Field of Classification Search
CPC ... H04L 5/0048; H04L 5/0023; H04L 5/0094; H04L 25/0224; H04L 25/0206
USPC .......................................................... 370/329
See application file for complete search history.

(56) References Cited

U.S. PATENT DOCUMENTS

| | | | |
|---|---|---|---|
| 2017/0264414 A1* | 9/2017 | Fröberg Olsson | .... H04L 5/0051 |
| 2018/0212809 A1 | 7/2018 | Bakulin et al. | |
| 2020/0177288 A1* | 6/2020 | Oswal | ................... H04L 27/364 |

* cited by examiner

TECHNIQUES FOR PROCESSING DIGITAL POST DISTORTION USING ADDITIONAL REFERENCE SYMBOLS

FIELD OF TECHNOLOGY

The present disclosure, for example, relates to wireless communication systems, and more particularly to techniques for processing digital post distortion using additional references symbols.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

Various aspects of the present disclosure relate to configuring a communication device, such as a user equipments (UEs) and a base station, for example, an eNodeB (eNB), a next-generation NodeB or a giga-NodeB (either of which may be referred to as a gNB) to support processing digital post distortion using an additional reference symbol. The communication device may transmit and receive multiple data streams to and from another communication device over a wireless channel. The communication device may estimate the wireless channel and precode the data streams based on the estimated wireless channel. The communication device may also amplify the precoded data streams to reduce effects of the wireless channel on the data streams. For example, the communication device may amplify each data stream using a separate amplifier. These amplifiers may, in some cases, each express different operating characteristics (e.g., nonlinearities) that may impact the data streams. Unless all the amplifiers share identical operating characteristics, the communication device might have to estimate each amplifiers contribution to the impact of the wireless channel. This involves channel estimation from each amplifier's output, which may consume added device resources, as well as power consumption. Various aspects of the present disclosure relate to the communication device adding an additional reference symbol (e.g., a demodulation reference symbol (DMRS)) to estimate the channel and the nonlinearity of each amplifier. As a result, the communication device may experience a minimum delay when transmitting and receiving the multiple data streams. In other words, the communication device can continue transmitting and receiving the multiple data streams at a reduced latency cost compared to if the communication device was to perform channel estimation from each amplifier's output. The present disclosure may, as a result, include features for improvements to wireless communications and, in some examples, may promote high reliability and low latency wireless communications in various system, such as 5G systems, among other benefits.

A method of wireless communication at a device is described. The method may include precoding a signal including at least two reference symbols for a single-layer transmission using at least two antenna ports, where at least a first reference symbol of the at least two reference symbols is associated with at least one data symbol of a data stream, estimating, based on the at least two reference symbols, a nonlinearity model of at least two power amplifiers associated with the single-layer transmission, determining an estimate of a nonlinearity factor of the precoded signal based on the estimated nonlinearity model, and communicating the precoded signal based on the determined estimate of the nonlinearity factor of the precoded signal.

An apparatus for wireless communication is described. The apparatus may include a processor, memory coupled with the processor, and instructions stored in the memory. The instructions may be executable by the processor to cause the apparatus to precode a signal including at least two reference symbols for a single-layer transmission using at least two antenna ports, where at least a first reference symbol of the at least two reference symbols is associated with at least one data symbol of a data stream, estimate, based on the at least two reference symbols, a nonlinearity model of at least two power amplifiers associated with the single-layer transmission, determine an estimate of a nonlinearity factor of the precoded signal based on the estimated nonlinearity model, and communicate the precoded signal based on the determined estimate of the nonlinearity factor of the precoded signal.

Another apparatus for wireless communication is described. The apparatus may include means for precoding a signal including at least two reference symbols for a single-layer transmission using at least two antenna ports, where at least a first reference symbol of the at least two reference symbols is associated with at least one data symbol of a data stream, estimating, based on the at least two reference symbols, a nonlinearity model of at least two power amplifiers associated with the single-layer transmission, determining an estimate of a nonlinearity factor of the precoded signal based on the estimated nonlinearity model, and communicating the precoded signal based on the determined estimate of the nonlinearity factor of the precoded signal.

A non-transitory computer-readable medium storing code for wireless communication at a device is described. The code may include instructions executable by a processor to precode a signal including at least two reference symbols for a single-layer transmission using at least two antenna ports, where at least a first reference symbol of the at least two reference symbols is associated with at least one data symbol of a data stream, estimate, based on the at least two reference symbols, a nonlinearity model of at least two power amplifiers associated with the single-layer transmission, determine an estimate of a nonlinearity factor of the precoded signal based on the estimated nonlinearity model, and communicate the precoded signal based on the determined estimate of the nonlinearity factor of the precoded signal.

In some examples of the method, apparatuses, and non-transitory computer-readable medium described herein, estimating a channel impulse response associated with the at least two power amplifiers based on the at least two precoded reference symbols, where determining the estimate of the nonlinearity factor of the precoded signal includes: determining the estimate of the nonlinear factor of the precoded signal based on the estimated channel impulse response.

Some examples of the method, apparatuses, and non-transitory computer-readable medium described herein may further include operations, features, means, or instructions for determining a precoding matrix, where precoding the signal includes precoding the signal including the at least two reference symbols for the single-layer transmission corresponding to the at least two antenna ports using the precoding matrix, where estimating the nonlinearity model or estimating the channel impulse response, or both, is based at least in part on the at least two reference symbols and the precoding matrix.

Some examples of the method, apparatuses, and non-transitory computer-readable medium described herein may further include operations, features, means, or instructions for estimating one or more data symbols associated with the first reference symbol, where determining the nonlinearity model includes determining the nonlinearity model of the at least two power amplifiers associated with the single-layer transmission corresponding to the at least two antenna ports based at least in part on the estimated one or more data symbols associated with the first reference symbol.

Some examples of the method, apparatuses, and non-transitory computer-readable medium described herein may further include operations, features, means, or instructions for estimating an input to each of the at least two power amplifiers based on the precoded signal and the estimated one or more data symbols associated with the first reference symbol, where determining the nonlinearity model includes determining the nonlinearity model of the at least two power amplifiers associated with the single-layer transmission corresponding to the at least two antenna ports based at least in part on the estimated input to each of the at least two power amplifiers.

Some examples of the method, apparatuses, and non-transitory computer-readable medium described herein may further include operations, features, means, or instructions for estimating a channel impulse response based on the estimated input to each of the at least two power amplifiers, where determining the estimate of the nonlinearity factor includes determining the estimate of the nonlinearity factor of the precoded signal at a receiver based at least in part on the estimated nonlinearity model of the at least two power amplifiers and the estimated channel impulse response.

In some examples of the method, apparatuses, and non-transitory computer-readable medium described herein, precoding the signal may include operations, features, means, or instructions for precoding the signal using a wideband precoding operation, and where the first reference symbol of the at least two reference symbols corresponds to a first orthogonal sequence based on the wideband precoding and a second reference symbol of the at least two reference symbols corresponds to a second orthogonal sequence different from the first orthogonal sequence based on the wideband precoding.

In some examples of the method, apparatuses, and non-transitory computer-readable medium described herein, the wideband precoding operation may be based on a phase.

In some examples of the method, apparatuses, and non-transitory computer-readable medium described herein, precoding the signal may include operations, features, means, or instructions for precoding the signal including the at least two reference symbols for the single-layer transmission corresponding to the at least two antenna ports using at least two precoding vectors of a precoding matrix, where a first precoding vector of the precoding matrix may be associated with the first reference symbol and a second precoding vector of the precoding matrix may be associated with a second reference symbol.

Some examples of the method, apparatuses, and non-transitory computer-readable medium described herein may further include operations, features, means, or instructions for transmitting a downlink control information (DCI) message including an indication to include a second reference symbol based on the single-layer transmission corresponding to the at least two antenna ports.

In some examples of the method, apparatuses, and non-transitory computer-readable medium described herein, the indication may be a bit indication.

In some examples of the method, apparatuses, and non-transitory computer-readable medium described herein, the indication corresponds to a transmitted precoding matrix indicator index.

Some examples of the method, apparatuses, and non-transitory computer-readable medium described herein may further include operations, features, means, or instructions for transmitting a radio resource control (RRC) configuration message including an indication to include a second reference symbol based on the single-layer transmission corresponding to the at least two antenna ports, where the indication corresponds to a transmitted precoding matrix indicator index.

Some examples of the method, apparatuses, and non-transitory computer-readable medium described herein may further include operations, features, means, or instructions for performing a hybrid precoding operation on the at least two power amplifiers in an analog domain, where estimating the nonlinearity model of the at least two power amplifiers may be based on the hybrid precoding operation on the at least two power amplifiers in the analog domain.

Some examples of the method, apparatuses, and non-transitory computer-readable medium described herein may further include operations, features, means, or instructions for determining to use a second reference symbol for the single-layer transmission corresponding to the at least two antenna ports based on a codebook table.

In some examples of the method, apparatuses, and non-transitory computer-readable medium described herein, a second reference symbol of the at least two reference symbols corresponds to a second directional beam orthogonal to a first directional beam associated with a signaled transmitted precoding matrix indicator.

In some examples of the method, apparatuses, and non-transitory computer-readable medium described herein, the precoded signal corresponds to a codebook-based uplink transmission.

In some examples of the method, apparatuses, and non-transitory computer-readable medium described herein, the precoded signal corresponds to a noncodebook-based uplink transmission.

In some examples of the method, apparatuses, and non-transitory computer-readable medium described herein, a number of reference symbols corresponds to a number of antenna ports for the single-layer transmission.

In some examples of the method, apparatuses, and non-transitory computer-readable medium described herein, a second reference symbol of the at least two reference symbols may be an extra reference symbol.

In some examples of the method, apparatuses, and non-transitory computer-readable medium described herein, the at least two reference symbols include a demodulation reference symbol.

In some examples of the method, apparatuses, and non-transitory computer-readable medium described herein, the first reference symbol of the at least two reference symbols includes a demodulation reference symbol and a second reference symbol of the at least two reference symbols includes a virtual demodulation reference symbol.

In some examples of the method, apparatuses, and non-transitory computer-readable medium described herein, at least a second reference symbol of the two reference symbols includes no data.

A method of wireless communication at a device is described. The method may include receiving a precoded signal including at least two reference symbols associated with a single-layer transmission using at least two antenna ports, where at least a first reference symbol of the two reference symbols is associated with at least one data symbol of a data stream, estimating, based on the at least two reference symbols, a nonlinearity model of at least two power amplifiers associated with the single-layer transmission, determining an estimate of a nonlinearity factor of the precoded signal based on the estimated nonlinearity model, and decoding the precoded signal based on the determined estimate of the nonlinearity factor of the precoded signal.

An apparatus for wireless communication is described. The apparatus may include a processor, memory coupled with the processor, and instructions stored in the memory. The instructions may be executable by the processor to cause the apparatus to receive a precoded signal including at least two reference symbols associated with a single-layer transmission using at least two antenna ports, where at least a first reference symbol of the two reference symbols is associated with at least one data symbol of a data stream, estimate, based on the at least two reference symbols, a nonlinearity model of at least two power amplifiers associated with the single-layer transmission, determine an estimate of a nonlinearity factor of the precoded signal based on the estimated nonlinearity model, and decode the precoded signal based on the determined estimate of the nonlinearity factor of the precoded signal.

Another apparatus for wireless communication is described. The apparatus may include means for receiving a precoded signal including at least two reference symbols associated with a single-layer transmission using at least two antenna ports, where at least a first reference symbol of the two reference symbols is associated with at least one data symbol of a data stream, estimating, based on the at least two reference symbols, a nonlinearity model of at least two power amplifiers associated with the single-layer transmission, determining an estimate of a nonlinearity factor of the precoded signal based on the estimated nonlinearity model, and decoding the precoded signal based on the determined estimate of the nonlinearity factor of the precoded signal.

A non-transitory computer-readable medium storing code for wireless communication at a device is described. The code may include instructions executable by a processor to receive a precoded signal including at least two reference symbols associated with a single-layer transmission using at least two antenna ports, where at least a first reference symbol of the two reference symbols is associated with at least one data symbol of a data stream, estimate, based on the at least two reference symbols, a nonlinearity model of at least two power amplifiers associated with the single-layer transmission, determine an estimate of a nonlinearity factor of the precoded signal based on the estimated nonlinearity model, and decode the precoded signal based on the determined estimate of the nonlinearity factor of the precoded signal.

Some examples of the method, apparatuses, and non-transitory computer-readable medium described herein may further include operations, features, means, or instructions for estimating a channel impulse response associated with the at least two power amplifiers based on the at least two precoded reference symbols, where determining the estimate of the nonlinearity factor of the precoded signal includes determining the estimate of the nonlinear factor of the precoded signal based at least in part on the estimated channel impulse response.

Some examples of the method, apparatuses, and non-transitory computer-readable medium described herein may further include operations, features, means, or instructions for adjusting the nonlinear factor of the precoded signal based on the estimated nonlinearity model of the at least two power amplifiers and the estimated channel impulse response, where adjusting the nonlinear factor of the precoded signal includes canceling, at the device, the nonlinear factor of the precoded signal.

Some examples of the method, apparatuses, and non-transitory computer-readable medium described herein may further include operations, features, means, or instructions for receiving a DCI message including an indication to include a second reference symbol based on the single-layer transmission corresponding to the at least two antenna ports.

In some examples of the method, apparatuses, and non-transitory computer-readable medium described herein, the indication may be a bit indication.

In some examples of the method, apparatuses, and non-transitory computer-readable medium described herein, the indication corresponds to a transmitted precoding matrix indicator index.

Some examples of the method, apparatuses, and non-transitory computer-readable medium described herein may further include operations, features, means, or instructions for receiving an RRC configuration message including an indication to include a second reference symbol based on the single-layer transmission corresponding to the at least two antenna ports, where the indication corresponds to a transmitted precoding matrix indicator index.

In some examples of the method, apparatuses, and non-transitory computer-readable medium described herein, a second reference symbol of the at least two reference symbols corresponds to a second directional beam orthogonal to a first directional beam associated with a signaled transmitted precoding matrix indicator.

In some examples of the method, apparatuses, and non-transitory computer-readable medium described herein, the precoded signal corresponds to a codebook-based uplink transmission.

In some examples of the method, apparatuses, and non-transitory computer-readable medium described herein, the precoded signal corresponds to a noncodebook-based uplink transmission.

In some examples of the method, apparatuses, and non-transitory computer-readable medium described herein, a number of reference symbols corresponds to a number of antenna ports for the single-layer transmission.

In some examples of the method, apparatuses, and non-transitory computer-readable medium described herein, a second reference symbol of the at least two reference symbols may be an extra reference symbol.

In some examples of the method, apparatuses, and non-transitory computer-readable medium described herein, the at least two reference symbols include a demodulation reference symbol.

In some examples of the method, apparatuses, and non-transitory computer-readable medium described herein, the first reference symbol of the at least two reference symbols includes a demodulation reference symbol and a second reference symbol of the at least two reference symbols includes a virtual demodulation reference symbol.

In some examples of the method, apparatuses, and non-transitory computer-readable medium described herein, at least a second reference symbol of the two reference symbols includes no data.

DETAILED DESCRIPTION

Figure 1:
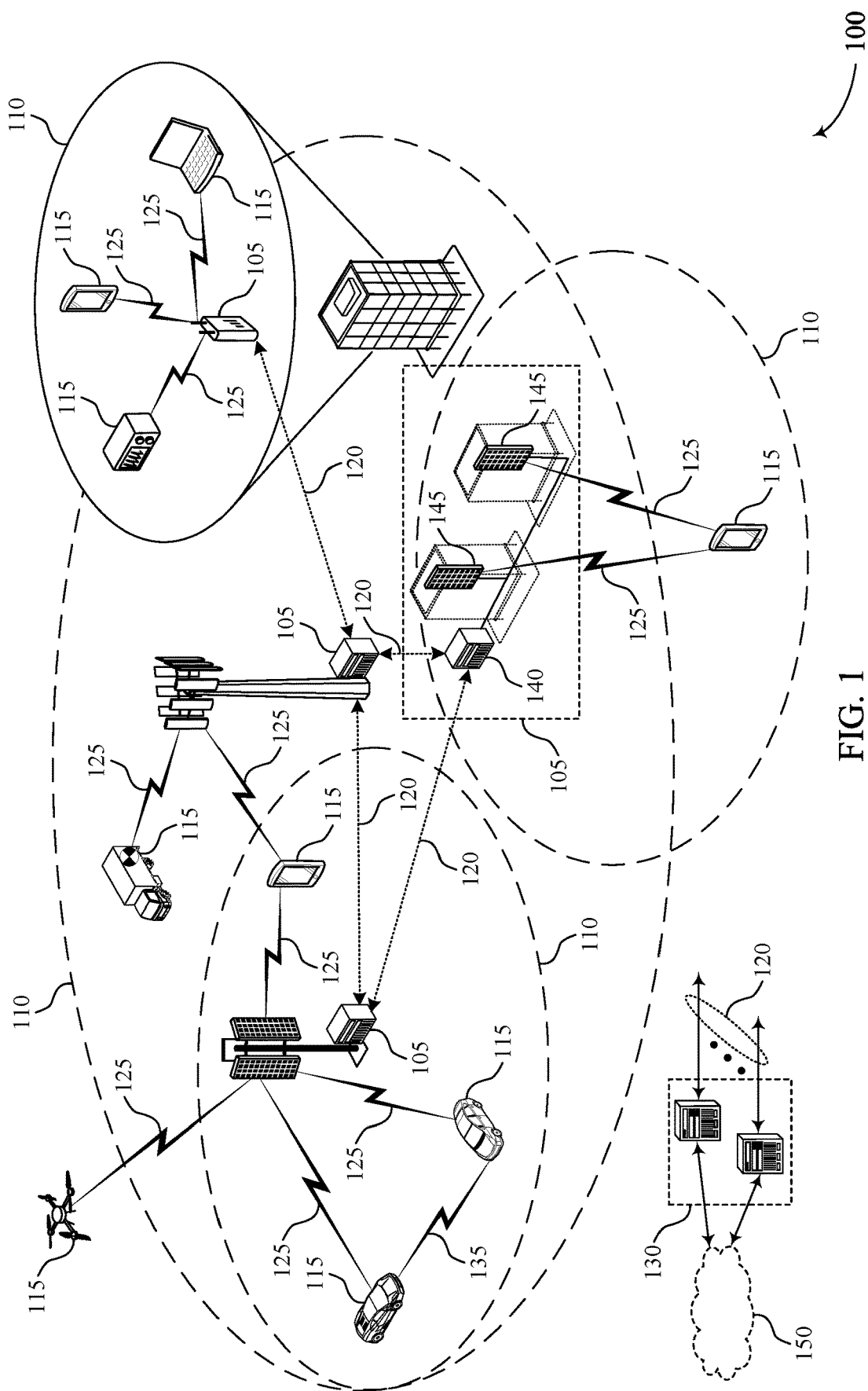
FIG. 1 illustrates an example of a wireless communication system that supports techniques for processing digital post distortion using additional reference symbols in accordance with various aspects of the present disclosure.

Some wireless communication systems may include communication devices, such as user equipments (UEs) and base stations, for example, eNodeBs (eNBs), next-generation NodeBs or giga-NodeBs (either of which may be referred to as a gNB) that may support multiple radio access technologies. Examples of radio access technologies include 4G systems such as Long Term Evolution (LTE) systems and fifth generation (5G) systems which may be referred to as New Radio (NR) systems. The UEs and the base stations may support multiple-input and multiple-output (MIMO) communications in 4G and 5G systems to achieve high data rates. For example, the UEs and the base stations may support MIMO communications using beamforming to provide high reliability of data stream transmissions. As demand for communication efficiency increases, it may be desirable for the UEs and the base stations to provide improvements to wireless operations (e.g., data stream transmissions) to support high reliability and low latency wireless communications, among other examples.

The UEs and the base stations may be configured to transmit and receive multiple data streams over a wireless channel. The UEs and the base stations may estimate the wireless channel and precode the data streams based on the estimated wireless channel. The UEs and the base stations may also amplify the precoded data streams to reduce effects of the wireless channel on the data streams. For example, the UEs and the base stations may amplify each data stream using a separate power amplifier. These power amplifiers may, in some cases, each express different operating characteristics, such as nonlinearities that may impact the data streams. To eliminate or decrease impairments, such as digital post distortion, a receiver device may have to determine the wireless channel from each transmit port of the transmitter device to the receiver device (e.g., the UEs). The receiver device may have reference symbols (e.g., reference pilots), which may be a function of transmission layers. In an example, the transmitter device may have two transmit antennas that may transmit one or two layers. Therefore, the transmitter device may have one or two DMRS ports. So, for one layer with some precoding, the receiver device might not be capable of compensating for nonlinearity imposed by the transmitter's power amplifiers, if more than one transmit port is used.

Unless all the power amplifiers share identical operating characteristics, the UEs and the base stations might have to estimate each power amplifiers contribution to the impact of the wireless channel. This involves channel estimation from each power amplifier's output, which may consume added resources (e.g., power, time, etc.). Various aspects of the present disclosure relate to the UEs and the base stations adding an additional reference symbol (e.g., an additional pilot), for example, a demodulation reference symbol (DMRS) to estimate the wireless channel and nonlinearity of each power amplifier. The additional reference symbol may thereby be used to estimate the wireless channel between a receiver device and each transmit port of a transmitter device.

For example, the UEs and the base stations may precode a signal including at least two reference symbols (e.g., DMRS) for a single-layer transmission using to at least two antenna ports. One reference symbol of the two reference symbols may be associated with data symbols of a data stream. The UEs and the base stations may estimate, based on the two reference symbols, a nonlinearity model of at least two power amplifiers associated with the single-layer transmission. Additionally, the UEs and the base stations may estimate, based on the two reference symbols, a channel impulse response associated with the at least two power amplifiers. The UEs and the base stations may determine an estimate of a nonlinearity factor of the precoded signal based on the estimated nonlinearity model or the estimated channel impulse response, or both, and adjust (e.g., reduce) the expected nonlinearity signal. Therefore, as part of enabling the UEs and the base stations to support digital post distortion, the UEs and the base stations add an additional reference symbol used to estimate a wireless channel and nonlinearity of each power amplifier.

Aspects of the present disclosure may be implemented to realize one or more of the following potential improvements, among others. The techniques employed by UEs may provide benefits and enhancements to the operation of the UEs. For example, operations performed by the UEs and the base stations may provide improvements to wireless operations (e.g., data stream transmissions). In some examples, configuring the UEs and the base stations to support techniques for processing digital post distortion using additional references symbols may promote high reliability and low latency wireless communications at the UEs. In some other examples, configuring the UEs and the base stations to support techniques for processing digital post distortion using additional references symbols may provide improvements to power consumption, spectral efficiency, and, in some examples, may promote high data rates and high data capacity for wireless communications at the UEs, among other benefits.

Aspects of the present disclosure are initially described in the context of wireless communications systems. Aspects of the present disclosure are further illustrated by and described with reference to apparatus diagrams, system diagrams, and flowcharts that relate to techniques for processing digital post distortion using additional reference symbols.

FIG. 1 illustrates an example of a wireless communication system 100 that supports techniques for processing digital post distortion using additional reference symbols in accordance with various aspects of the present disclosure. The wireless communication system 100 may include one or more base stations 105, one or more UEs 115, and a core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In the wireless communication system 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communication system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105. Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the base stations 105 may be configured to transmit and receive multiple data streams over a wireless channel in the wireless communication system 100. The UEs 115 and the base stations 105 may estimate the wireless channel and precode the data streams based on the estimated wireless channel in the wireless communication system 100. The UEs 115 and the base stations 105 may also amplify the precoded data streams to reduce effects of the wireless channel on the data streams. For example, the UEs 115 and the base stations 105 may amplify each data stream using a separate power amplifier. These power amplifiers may, in some cases, each express different operating characteristics, such as nonlinearities that may impact the data streams. To eliminate or decrease impairments, such as digital post distortion, a receiver device (e.g., the UEs 115) may have to determine the wireless channel from each transmit port of the transmitter device to the receiver device (e.g., the UEs 115).

The receiver device may have reference symbols (e.g., reference pilots), which may be a function of transmission layers. In an example, the transmitter device (e.g., the base stations 105) may have two transmit antennas that may transmit one or two layers. Therefore, the transmitter device (e.g., the base stations 105) may have one or two DMRS ports. So, for one layer with some precoding, the receiver device (e.g., the UEs 115) might not be capable of compensating for nonlinearity imposed by the transmitter device's (e.g., the base stations 105) power amplifiers, if more than one transmit port is used. Unless all the power amplifiers share identical operating characteristics, the UEs and the base stations might have to estimate each power amplifiers contribution to the impact of the wireless channel. This involves channel estimation from each power amplifier's output, which may consume added resources (e.g., power, time, etc.). Various aspects of the present disclosure relate to the UEs 115 and the base stations 105 adding an additional reference symbol (e.g., an additional pilot), for example, a DMRS to estimate the wireless channel and nonlinearity of each power amplifier. The additional reference symbol may thereby be used to estimate the wireless channel between a receiver device and each transmit port of a transmitter device in the wireless communication system 100.

For example, the UEs 115 and the base stations 105 may precode a signal including at least two reference symbols (e.g., at least one DMRS and at least one virtual DMRS) for a single-layer transmission using at least two antenna ports. One reference symbol of the two reference symbols may include data, while the other reference symbol may not include data. The UEs 115 and the base stations 105 may estimate, based on the two reference symbols, a nonlinearity model of at least two power amplifiers associated with the single-layer transmission. Additionally, the UEs 115 and the base stations 105 may estimate, based on the two reference symbols, a channel impulse response associated with the at least two power amplifiers. The UEs 115 and the base stations 105 may determine an estimate of a nonlinearity factor of the precoded signal based on the estimated nonlinearity model or the estimated channel impulse response, or both, and adjust (e.g., reduce) the expected nonlinearity signal. Therefore, as part of enabling the UEs 115 and the base stations 105 to support digital post distortion, the UEs 115 and the base stations 105 add an additional reference symbol used to estimate a wireless channel and nonlinearity of each power amplifier.

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
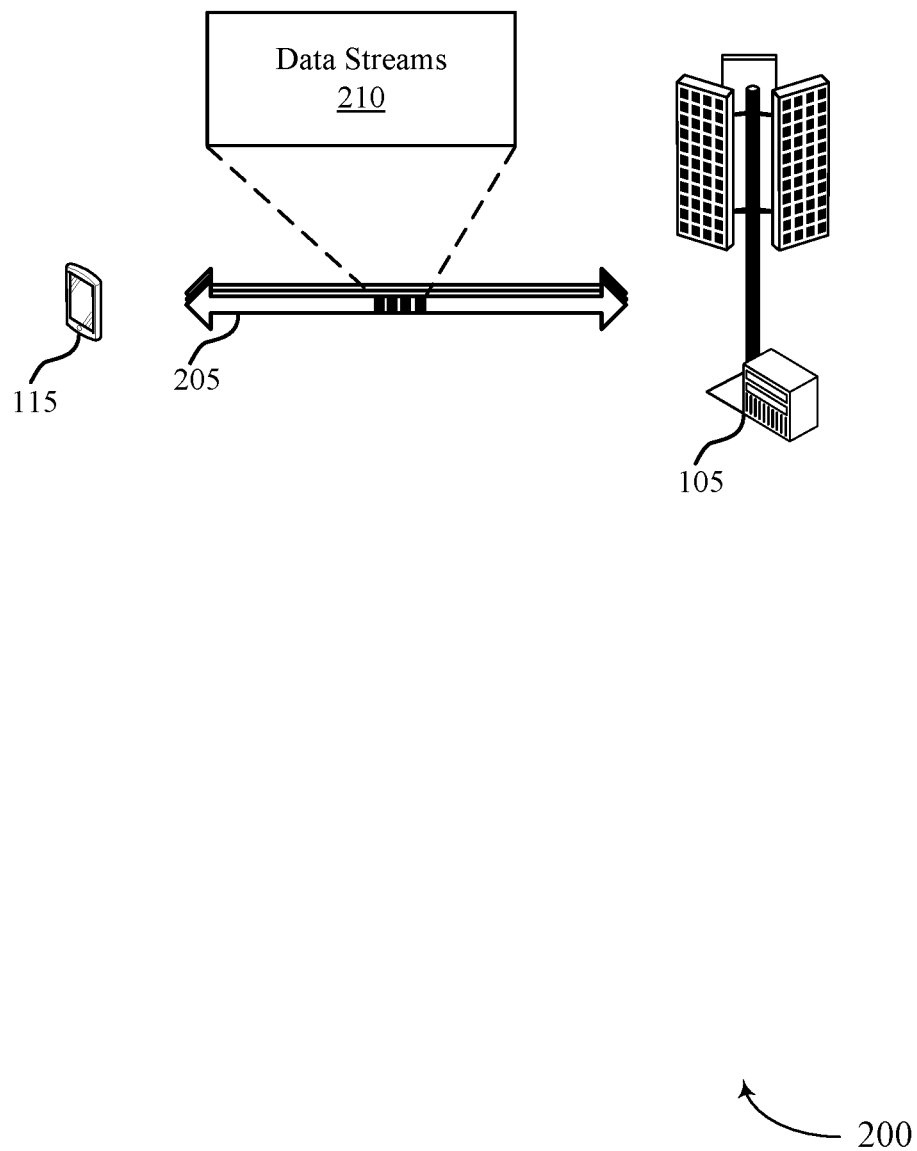
FIG. 2 illustrates an example of a wireless communication system that supports techniques for processing digital post distortion using additional reference symbols in accordance with various aspects of the present disclosure.

FIG. 2 illustrates an example of a wireless communication system 200 that supports techniques for processing digital post distortion using additional reference symbols in accordance with various aspects of the present disclosure. The wireless communication system 200 may implement aspects of the wireless communication system 100. For example, the wireless communication system 200 may include a base station 105 and a UE 115, which may be examples of a base station 105 and a UE 115 as described herein. The wireless communication system 200 may support multiple radio access technologies including 4G systems such as LTE systems, LTE-A systems, or LTE-A Pro systems, and 5G systems, which may be referred to as NR systems.

The base station 105 and the UE 115 may be configured with multiple antennas, which may be used to employ techniques such as transmit diversity, receive diversity, multiple-input multiple-output communications, or beamforming, or any combination thereof. The antennas of the base station 105 and the UE 115 may be located within one or more antenna arrays or antenna panels, which may support multiple-input multiple-output operations or transmit or receive beamforming. For example, the base station 105 antennas or antenna arrays may be co-located at an antenna assembly, such as an antenna tower. In some examples, antennas or antenna arrays associated with the base station 105 may be located in diverse geographic locations.

The base station 105 may have an antenna array with a number of rows and columns of antenna ports that the base station 105 may use to support beamforming of communications with the UE 115. Likewise, the UE 115 may have one or more antenna arrays that may support various multiple-input multiple-output or beamforming operations. Additionally or alternatively, an antenna panel may support radio frequency beamforming for a signal transmitted via one or more antenna ports. The base station 105 and the UE 115 may thereby be configured to support directional communications 205 (e.g., beamformed communications) using the multiple antennas.

The base station 105 and the UE 115 may communicate one or multiple data streams 210 via the directional communications 205. For example, the base station 105 and the UE 115 may be configured to support multiple downlink data streams and multiple uplink data streams via the directional communications 205. The base station 105 and the UE 115 may be configured to support the directional communications 205 in the wireless communication system 200 to achieve high data rates. For example, the base station 105 and the UE 115 may support the directional communications 205 using beamforming to provide high reliability for the one or multiple data streams 210.

In some examples, the base station 105 may include m transmit antennas and the UE 115 may include n receive antennas. Likewise, the UE 115 may include m transmit antennas and the base station 105 may include n receive antennas. The UE 115 may receive a signal y that results when an input signal vector x is multiplied by a channel matrix H (i.e., y=x×H). The channel matrix H includes channel impulse responses $h_{nm}$, which corresponds to a wireless channel between the base station 105 and the UE 115, and more particularly between a transmit antenna m and a receive antenna n. A rank of the channel matrix H may define a number of linearly independent rows or columns in the channel matrix H. In other words, the rank may indicate a number of separate data streams (also referred to as layers) of the one or multiple data streams 210 that can be transmitted or received simultaneously.

The base station 105 and the UE 115 may be configured to support transmit diversity to increase a reliability associated with the one or multiple data streams 210. Transmit diversity may refer to when a data stream of the one or multiple data streams 210 is transmitted redundantly by the base station 105 and the UE 115 over more than one transmit antenna of the base station 105 and the UE 115. Alternatively or additionally, the base station 105 and the UE 115 may be configured to support spatial multiplexing to increase a data rate associated with the one or multiple data streams 210. For example, the base station 105 and the UE 115 may segment data into the one or multiple data streams 210 and transmit the one or multiple data streams 210 simultaneously over same time and/or frequency resources of the wireless channel. The base station 105 and the UE 115 may include reference time and/or frequency resources (e.g., pilots or reference symbols). A receiver device (e.g., the UE 115) can perform a channel estimation for each transmit antenna of a transmitter device (e.g., the base station 105) using the reference time and/or frequency resources (e.g., pilots or reference symbols).

The base station 105 and the UE 115 may support digital precoding or radio frequency beamforming to generate a combined beam for the one or multiple data streams 210. In some examples, the UE 115 may be configured to support estimating a channel H between the base station 105 and the UE 115 according to the reference time and/or frequency resources (e.g., pilots or reference symbols). For example, the base station 105 may transmit a reference signal (e.g., a cell-specific reference signal (CRS), a channel state information reference signal (CSI-RS), a demodulation reference signal (DMRS)), which may be precoded or unprecoded. The UE 115 may transmit a response regarding the channel H situation, which includes information about which precoding is preferred from a defined codebook for codebook-based transmissions. For example, the UE 115 may report feedback that indicates precoding weights for one or more beam directions, and the feedback may correspond to a configured number of beams across a system bandwidth or one or more sub-bands. The UE 115 may provide feedback for beam selection, which may be a precoding matrix indicator (PMI) or a codebook-based feedback (e.g., a multi-panel type codebook, a linear combination type codebook, a port selection type codebook).

By way of example, the base station 105 and the UE 115 may precode a block of vectors $[y^{(0)}(i) \ldots y^{(v-1)}(i)]^T$ where $i=0, 1, \ldots, M_{symb}^{layer}-1$ according to the following Equation (1):

$$\begin{bmatrix} z^{(p_0)}(i) \\ \vdots \\ z^{(p_{P-1})}(i) \end{bmatrix} = W \begin{bmatrix} y^{(0)}(i) \\ \vdots \\ y^{(v-1)}(i) \end{bmatrix} \quad (1)$$

where $i=0, 1, \ldots, M_{symb}^{ap}-1$ and $M_{symb}^{ap}=M_{symb}^{layer}$. The base station 105 and the UE 115 may determine a set of antenna ports $\{p_0, \ldots, p_{P-1}\}$. In some examples, for non-codebook-based transmission, the precoding matrix W equals the identity matrix. In some other examples, for codebook-based transmission, the precoding matrix W is given by W=1 for single-layer transmission on a single antenna port. Otherwise, the base station 105 and the UE 115 may determine and select a precoding matrix W, in Table 1, based on a TPMI index. For example, the UE 115 may determine and select a precoding matrix W, in Table 1, based on a TPMI index indicated in a downlink control information (DCI) message received from the base station 105. The DCI message received from the base station 105 may schedule one or multiple uplink data streams (e.g., the one or multiple data streams 210).

the wireless channel on the precoded one or multiple data streams 210. For example, the base station 105 and the UE 115 may amplify each data stream using a separate power amplifier. These power amplifiers may, in some cases, each express different operating characteristics (e.g., nonlinearities) that may impact the one or multiple data streams 210. For example, the base station 105 and the UE 115 may employ digital post distortion of the one or multiple data streams 210.

The wireless communication system 200 may enable digital post distortion signal processing to compensate for nonlinearity of power amplifiers. In the wireless communication system 200, a receiver device (e.g., the UE 115) may thereby have to determine a nonlinearity per power amplifier of a transmitter device (e.g., the base station 105). Unless all the power amplifiers share identical operating characteristics, the receiver device (e.g., the UE 115) might have to estimate each power amplifiers contribution to the impact of the wireless channel. This involves adding precoding matrices and channel estimation from each power amplifier's output, which may consume added device resources, as well as power consumption.

In the wireless communication system 200, the base station 105 and the UE 115 may be configured to add an additional reference symbol (e.g., an additional pilot), for example, a DMRS to estimate the wireless channel and nonlinearity of each power amplifier. The additional reference symbol may thereby be used to estimate the wireless channel between a receiver device (e.g., the UE 115) and each transmit port of a transmitter device (e.g., the base station 105). For one layer transmission, knowledge of a precoding at a receiver device (e.g., the UE 115) may help the receiver device to recover the per power amplifier nonlinearity. However, for two or more layer transmissions, the base station 105 and the UE 115 may have to add the additional reference symbol to compensate for each power amplifier's nonlinearity.

The base station 105 and the UE 115 may add an additional reference symbol per power amplifier. The additional reference symbol may be applicable for uplink data streams and downlink data streams. For example, the additional reference symbol may be applicable for uplink data streams in various frequency ranges (FR), such as FRI that may refer to a frequency range between about 450 MHz and about 7.125 GHz in which hybrid precoding is used by the base station 105 and the UE 115. For hybrid precoding, the base station 105 and the UE 115 may precode a group of power amplifiers in an analog domain.

As described herein, in some examples, for non-codebook-based transmission, the precoding matrix W equals the identity matrix. In some other examples, for codebook-based transmission, the precoding matrix W is given by W=1 for

TABLE 1

Precoding Matrix W for Single-Layer Transmission Using Two Antenna Ports.

| TPMI Index | W (ordered from left to right in increasing order of TPMI index) |
|---|---|
| 0-5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — — |

The base station 105 and the UE 115 may precode the one or multiple data streams 210, as well as amplify the precoded one or multiple data streams 210 to reduce effects of single-layer transmission on a single antenna port. Otherwise, the base station 105 and the UE 115 may determine and select a precoding matrix W, in Table 2, based on a TPMI index. For instance, the base station 105 and the UE 115 may determine whether to send an additional reference symbol based on a configuration (e.g., an RRC configuration) or an indication (e.g., a bit indication in a DCI message). The UE 115 may, for example, determine and select a precoding matrix W, in Table 2, based on a TPMI index indicated in a DCI message received from the base station 105. The DCI message received from the base station 105 may schedule one or multiple uplink data streams (e.g., the one or multiple data streams 210).

TABLE 2

Additional DMRS Precoding Matrix W for Single-Layer Transmission Using Two Antenna Ports.

| TPMI Index | W (ordered from left to right in increasing order of TPMI index) | | | | | |
|---|---|---|---|---|---|---|
| 0-5 | None | None | $\frac{1}{\sqrt{2}}\begin{bmatrix}1\\-1\end{bmatrix}$ | $\frac{1}{\sqrt{2}}\begin{bmatrix}1\\1\end{bmatrix}$ | $\frac{1}{\sqrt{2}}\begin{bmatrix}1\\-j\end{bmatrix}$ | $\frac{1}{\sqrt{2}}\begin{bmatrix}1\\j\end{bmatrix}$ |

For a codebook-based transmission, the additional reference symbol may be orthogonal to the signaled TPMI. In some examples, when the precoding is $[1 0]^T$, the additional reference symbol might not be transmitted by the base station 105 and the UE 115. In some examples, if one transmit antenna is used for the one or multiple data streams 210, the base station 105 and the UE 115 might not use the additional reference symbol. For a noncodebook-based transmission, when the precoding is a wideband precoding operation $[1\ e^{jP(i)}]^T$, the additional reference symbol may have the following orthogonal sequence $[1 - e^{jP(i)}]^T$. In some examples, the base station 105 and the UE 115 may use the wideband precoding operation based on a phase of the directional communications 205 (e.g., a phase of each directional beam). Accordingly, for codebook-based transmission, Table 2 includes the additional reference symbol (e.g., DMRS). Alternatively, for noncodebook-based transmission, the base station 105 and the UE 115 may multiple each layer with a Hadamard matrix.

The base station 105 and the UE 115 may, by adding an additional reference symbol (e.g., a DMRS), estimate the wireless channel and the nonlinearity of each power amplifier. As a result, the base station 105 and the UE 115 may experience a minimum delay when transmitting and receiving the one or multiple data streams 210. In other words, the base station 105 and the UE 115 can continue transmitting and receiving the one or multiple data streams 210 at a reduced latency cost compared to if the base station 105 and the UE 115 were to perform channel estimation from each power amplifier's output. The base station 105 and the UE 115 may, as a result, include features for improvements to wireless communications and, in some examples, may promote high reliability and low latency wireless communications, among other benefits.

Figure 3:
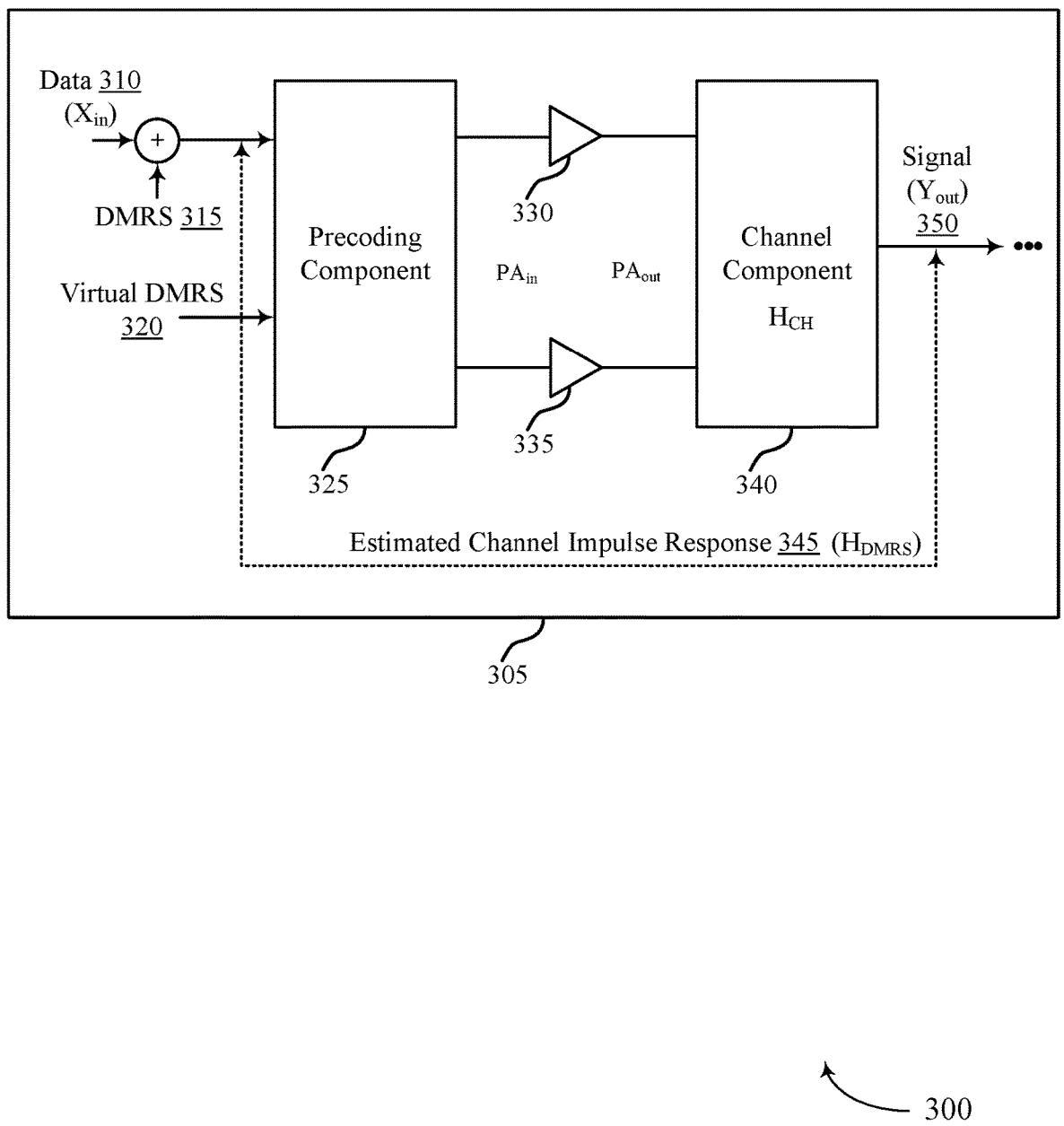
FIG. 3 illustrates an example of a block diagram of a device that supports techniques for processing digital post distortion using additional reference symbols in accordance with various aspects of the present disclosure.

FIG. 3 illustrates an example of a block diagram 300 of a device 305 that supports techniques for processing digital post distortion using additional reference symbols in accordance with various aspects of the present disclosure. The device 305 may be an example of aspects of a base station 105 and a UE 115 as described herein. For example, the device 305 may be a receiver device or a transmitter device, or both. The device 305 may include a precoding component 325, a power amplifier 330, a power amplifier 335, and a channel component 340. Each of these components may be in communication with one another (e.g., via one or more circuit buses). In some examples, one or more of these components may be physically located at various positions, including being distributed such that portions of functions are implemented at different physical locations by one or more physical components. For example, one or more of these components may be part of a receiver device while one or more of these components may be part of a transmitter device.

The device 305 may perform transmit with the same precoding on at least one data symbol 310 and a DMRS 315.

The precoding component 325 of the device 305 may precode a signal including at least two reference symbols for a single-layer transmission using at least two antenna ports. The precoding component 325 of the device 305 may determine a precoding matrix and precode the signal including the at least two reference symbols using the precoding matrix. In some examples, at least one reference symbol of the at least two reference symbols may be the DMRS 315 that is associated with the at least one data symbol 310 of a data stream. The other reference symbol of the at least two reference symbols may be a virtual DMRS 320, which may be an additional reference symbol.

The device 305 may use the additional reference symbol to estimate a channel impulse response and a nonlinearity of each of the power amplifier 330 and the power amplifier 335. In some examples, the device 305 may determine how many additional reference symbols to use to estimate the channel impulse response and the nonlinearity per power amplifier. For example, the device 305 may determine how many additional reference symbols to use based on a difference between a number of transmit ports $N_{TX}$ and a number of spatial streams $N_{SS}$ (i.e., a number of layers). From the DMRS 315 and the virtual DMRS 320, the device 305 may estimate a channel from all power amplifiers (e.g., the power amplifier 330 and the power amplifier 335) and their nonlinearity model.

For example, the channel component 340 may estimate, based on the at least two reference symbols, a nonlinearity model of the power amplifier 330 and the power amplifier 335 associated with the single-layer transmission. The channel component 340 may also estimate a channel impulse response associated with the power amplifier 330 and the power amplifier 335 based on the at least two precoded reference symbols. The channel component 340 may determine an estimate of a nonlinearity factor of the precoded signal based on the estimated nonlinearity model and the estimated channel impulse response 345. The device 305 may determine the nonlinearity model according to the following Equation (2):

$$PA_{out,ant} \approx PA_{in} + \Sigma_{k>0} \alpha_{k,ant} \cdot |PA_{in,ant}|^{2k} \cdot PA_{in,ant} \quad (2)$$

where $PA_{in,ant}$ is the input and $PA_{out,ant}$ is the output associated with the power amplifier 330 and the power amplifier 335, and $\alpha_{k,ant}$ is the nonlinearity factor. The device 305 may estimate the channel impulse response and the nonlinearity factor associated with the power amplifier 330 and the power amplifier 335 according to the following expressions:

$$\hat{h}_{PA} = \begin{bmatrix} \hat{h}_{PA,0} \\ \hat{h}_{PA,1} \end{bmatrix}$$

$$\hat{h}_{DRMS} = \hat{h}_{PA} \cdot W$$

$$\hat{h}_{DMRS} = \hat{h}_{PA} \cdot W^{-1}$$

$$\alpha_{ant_0}, \alpha_{ant_1}$$

The device 305 may estimate one or more data symbols of a data stream and associated with the DMRS 315. From the estimated one or more data symbols and the precoding, the device 305 may estimate an input $PA_{in}$ to each of the power amplifier 330 and the power amplifier 335. The device 305 may, from the estimated input $PA_{in}$, estimate the nonlinearity model of the power amplifier 330 and the power amplifier 335. That is, the device 305 may determine an estimate of a nonlinearity factor of the precoded signal (e.g., a projected nonlinearity in a receiver input). The device 305 adjust (e.g., cancel) nonlinearity factor of the precoded signal. In other words, the device 305 may reduce the expected nonlinearity signal 350 and repeat one or more of the above operations. For example, the device 305 may determine the expected nonlinearity signal 350 based on the following expression and Equation (3):

$$\begin{bmatrix} PA_{in,0} \\ PA_{in,1} \end{bmatrix} = W \cdot \hat{x}_i \quad (3)$$

$$y_i = y_0 - \Sigma_{ant} \hat{h}_{PA,ant} \cdot \Sigma_{k>0} \alpha_{k,ant} \cdot |PA_{in,ant}|^{2k} \cdot PA_{in,ant}$$

Figure 4:
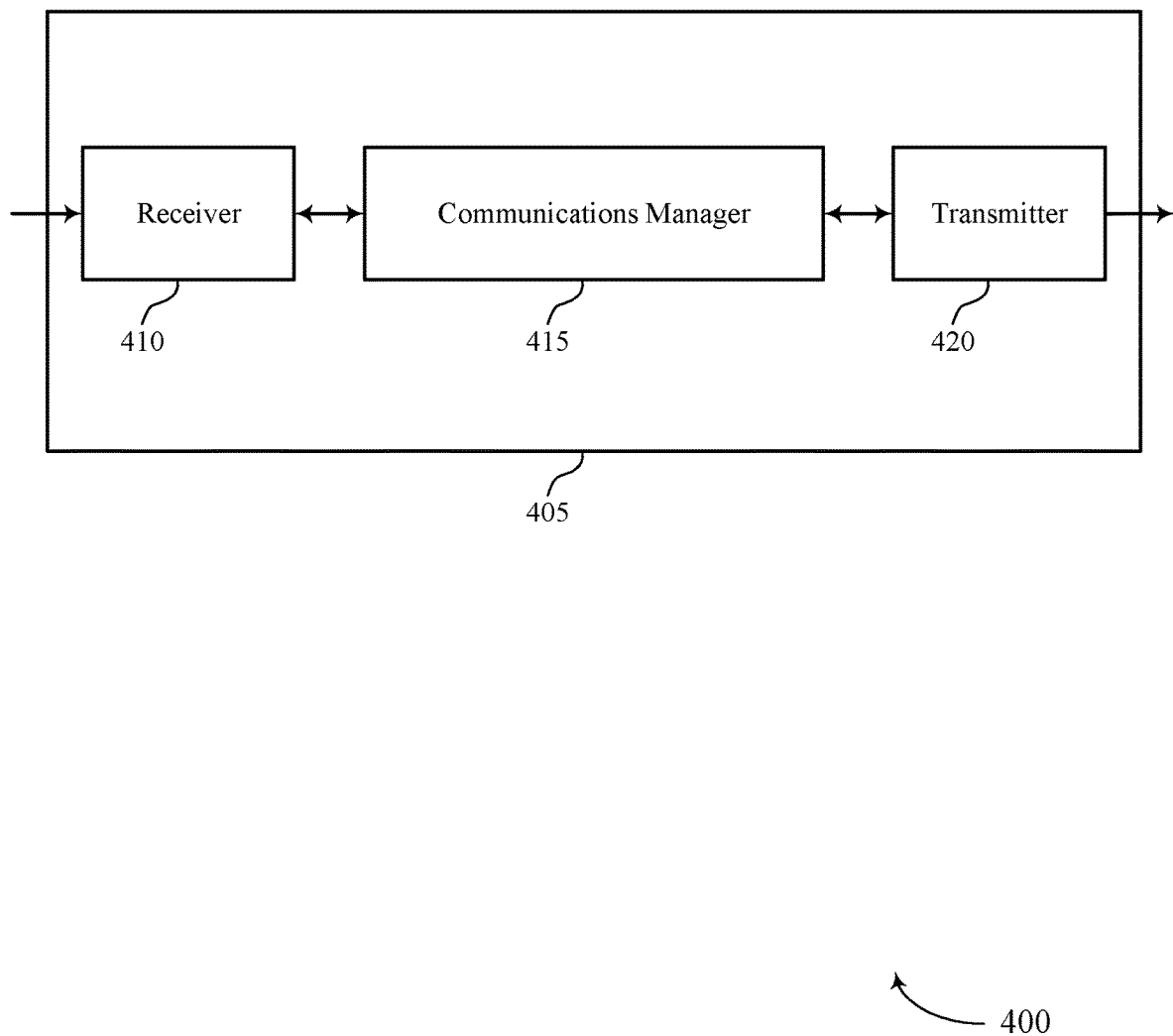
FIGS. 4 and 5 show block diagrams of devices that support techniques for processing digital post distortion using additional reference symbols in accordance with various aspects of the present disclosure.

The device 305 may, by adding an additional reference symbol (e.g., a DMRS), estimate the wireless channel and the nonlinearity of each power amplifier. As a result, the device 305 may experience a minimum delay when transmitting and receiving the one or multiple data streams. In other words, the device 305 can continue transmitting and receiving the one or multiple data streams at a reduced latency cost compared to if device 305 were to perform channel estimation from each power amplifier's output. The device 305 may, as a result, include features for improvements to wireless communications and, in some examples, may promote high reliability and low latency wireless communications, among other benefits FIG. 4 shows a block diagram 400 of a device 405 that supports techniques for processing digital post distortion using additional reference symbols in accordance with various aspects of the present disclosure. The device 405 may be an example of aspects of a device as described herein. For example, the device 405 may be a receiver device or a transmitter device, or both. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to techniques for processing digital post distortion using additional reference symbols, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may precode a signal including at least two reference symbols for a single-layer transmission using at least two antenna ports, where at least a first reference symbol of the at least two reference symbols is associated with at least one data symbol of a data stream. The communications manager 415 may estimate, based on the at least two reference symbols, a nonlinearity model of at least two power amplifiers associated with the single-layer transmission. The communications manager 415 may determine an estimate of a nonlinearity factor of the precoded signal based on the estimated nonlinearity model, and communicate the precoded signal based on the determined estimate of the nonlinearity factor of the precoded signal.

The communications manager 415 may also receive a precoded signal including at least two reference symbols associated with a single-layer transmission using at least two antenna ports, where at least a first reference symbol of the two reference symbols is associated with at least one data symbol of a data stream. The communications manager 415 may estimate, based on the at least two reference symbols, a nonlinearity model of at least two power amplifiers associated with the single-layer transmission, and determine an estimate of a nonlinearity factor of the precoded signal based on the estimated nonlinearity model. The communications manager 415 may decode the precoded signal based on the determined estimate of the nonlinearity factor of the precoded signal. The communications manager 415 may be an example of aspects of the communications manager 710 described herein.

The communications manager 415 may be implemented as an integrated circuit or chipset for a mobile device modem, and the receiver 410 and the transmitter 420 may be implemented as analog components (e.g., amplifiers, filters, antennas, etc.) coupled with the mobile device modem to enable wireless transmission and reception. The communications manager 415 as described herein may be implemented to realize one or more potential improvements. At least one implementation may enable the communications manager 415 to process digital post distortion using additional reference symbols. Based on implementing the digital post distortion using additional reference symbols as described herein, one or more processors of the device 405 (e.g., processor(s) controlling or incorporated with the communications manager 415) may experience reduce power consumption and promote high reliability and low latency wireless communications (e.g., data stream transmissions), among other benefits.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver. For example, the transmitter 420 may be an example of aspects of the transceiver 720 described with reference to FIG. 7. The transmitter 420 may utilize a single antenna or a set of antennas.

Figure 5:
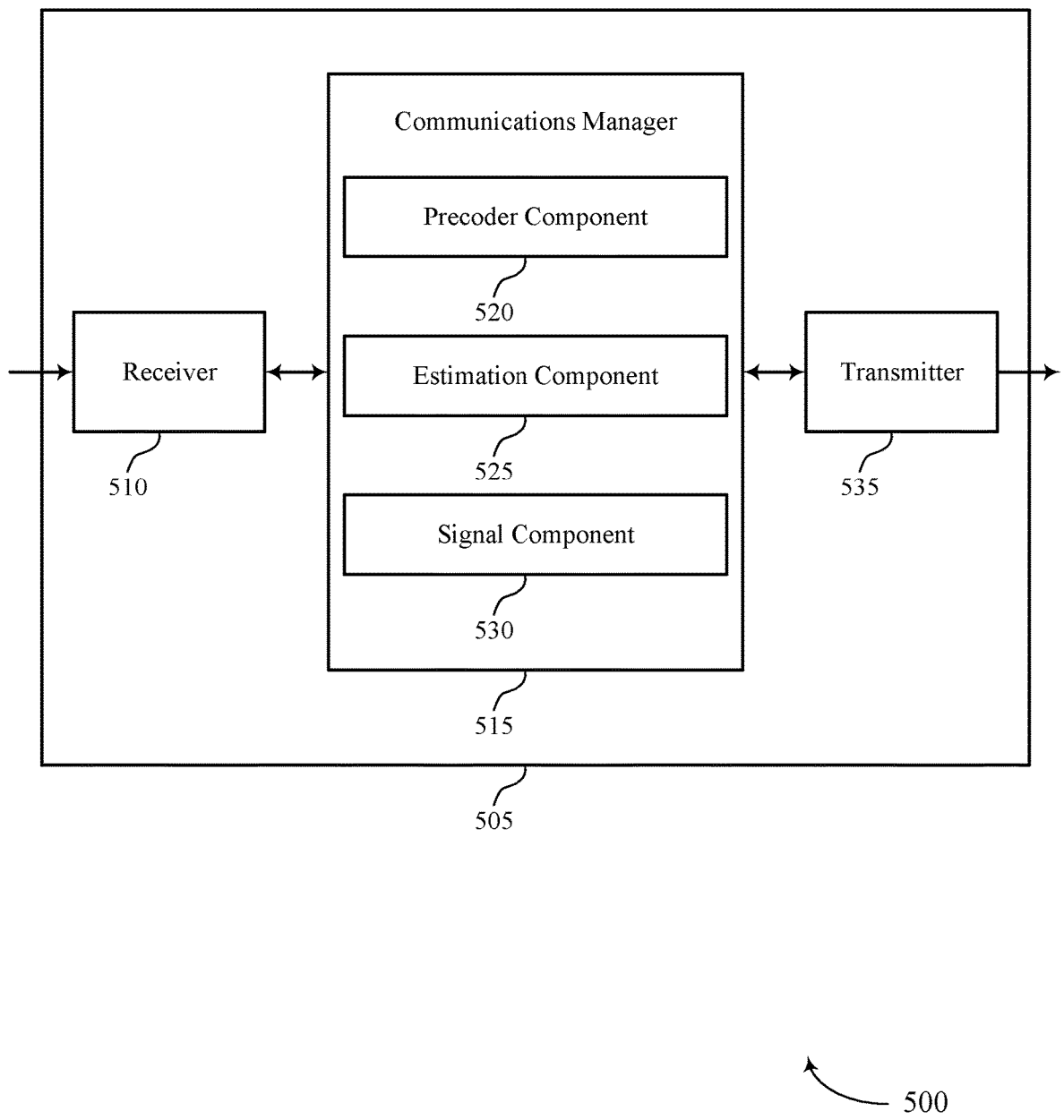

FIG. 5 shows a block diagram 500 of a device 505 that supports techniques for processing digital post distortion using additional reference symbols in accordance with various aspects of the present disclosure. The device 505 may be an example of aspects of a device 405 or a device 115 as described herein. For example, the device 505 may be a receiver device or a transmitter device, or both. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to techniques for processing digital post distortion using additional reference symbols, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a precoder component 520, an estimation component 525, and a signal component 530. The communications manager 515 may be an example of aspects of the communications manager 710 described herein.

The precoder component 520 may precode a signal including at least two reference symbols for a single-layer transmission using at least two antenna ports, where at least a first reference symbol of the at least two reference symbols is associated with at least one data symbol of a data stream. The estimation component 525 may estimate, based on the at least two reference symbols, a nonlinearity model of at least two power amplifiers associated with the single-layer transmission and determine an estimate of a nonlinearity factor of the precoded signal based on the estimated nonlinearity model. The signal component 530 may communicate the precoded signal based on the determined estimate of the nonlinearity factor of the precoded signal.

The signal component 530 may receive a precoded signal including at least two reference symbols associated with a single-layer transmission using at least two antenna ports, where at least a first reference symbol of the two reference symbols is associated with at least one data symbol of a data stream. The estimation component 525 may estimate, based on the at least two reference symbols, a nonlinearity model of at least two power amplifiers associated with the single-layer transmission and determine an estimate of a nonlinearity factor of the precoded signal based on the estimated nonlinearity model. The signal component 530 may decode the precoded signal based on the determined estimate of the nonlinearity factor of the precoded signal.

The transmitter 535 may transmit signals generated by other components of the device 505. In some examples, the transmitter 535 may be collocated with a receiver 510 in a transceiver. For example, the transmitter 535 may be an example of aspects of the transceiver 720 described with reference to FIG. 7. The transmitter 535 may utilize a single antenna or a set of antennas.

Figure 6:
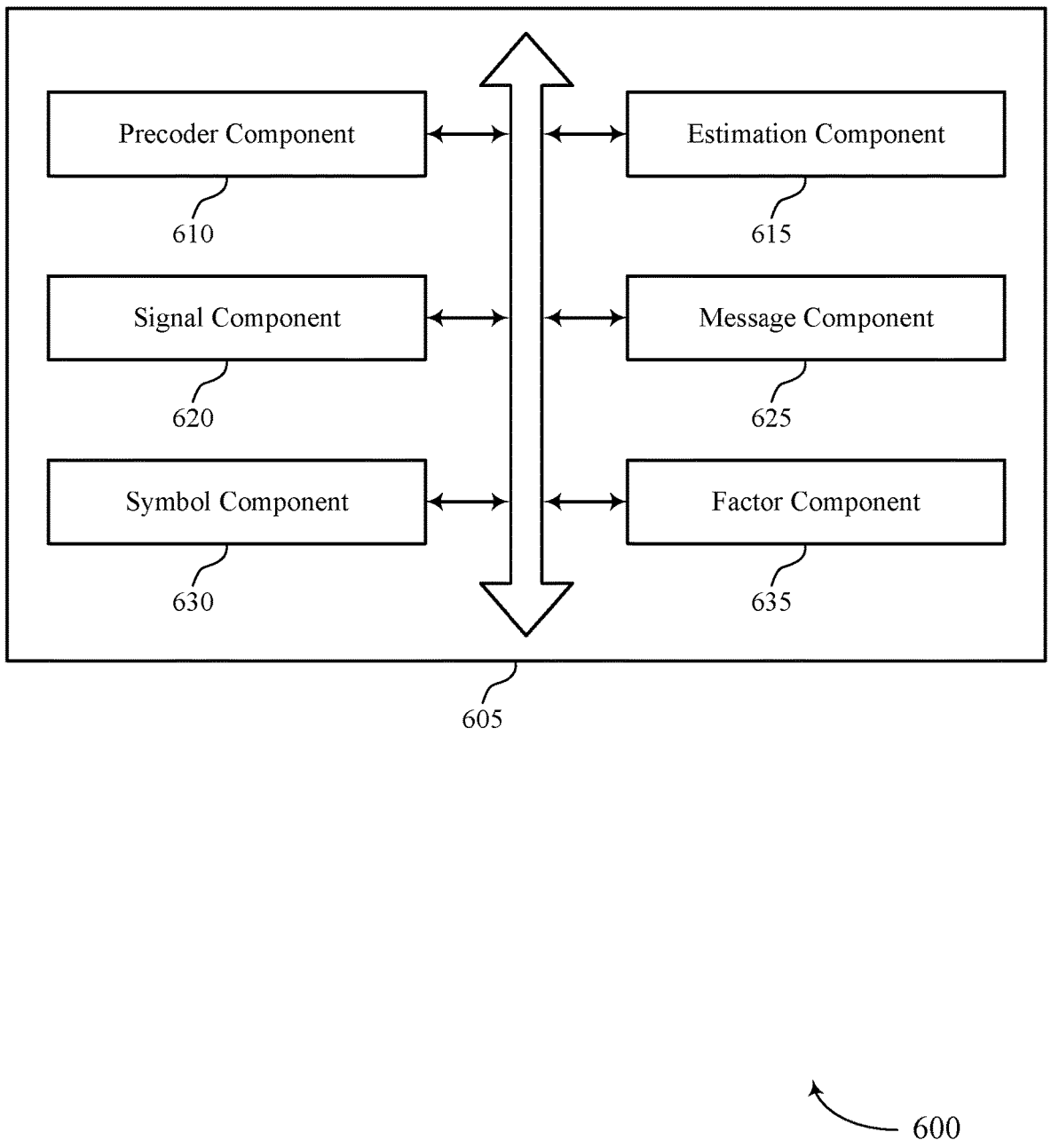
FIG. 6 shows a block diagram of a communications manager that supports techniques for processing digital post distortion using additional reference symbols in accordance with various aspects of the present disclosure.

FIG. 6 shows a block diagram 600 of a communications manager 605 that supports techniques for processing digital post distortion using additional reference symbols in accordance with various aspects of the present disclosure. The communications manager 605 may be an example of aspects of a communications manager 415, a communications manager 515, or a communications manager 710 described herein. The communications manager 605 may include a precoder component 610, an estimation component 615, a signal component 620, a message component 625, a symbol component 630, and a factor component 635. Each of these components may communicate, directly or indirectly, with one another (e.g., via one or more buses).

The precoder component 610 may precode a signal including at least two reference symbols for a single-layer transmission using at least two antenna ports, where at least a first reference symbol of the at least two reference symbols is associated with at least one data symbol of a data stream. In some examples, the precoder component 610 may determine a precoding matrix, where precoding the signal includes precoding the signal including the at least two reference symbols for the single-layer transmission corresponding to the at least two antenna ports using the precoding matrix, wherein estimating the nonlinearity model or estimating the channel impulse response, or both, is based at least in part on the at least two reference symbols and the precoding matrix. In some examples, the precoder component 610 may precode the signal using a wideband precoding operation, where the first reference symbol of the at least two reference symbols corresponds to a first orthogonal sequence based on the wideband precoding and a second reference symbol of the at least two reference symbols corresponds to a second orthogonal sequence different from the first orthogonal sequence based on the wideband precoding.

The precoder component 610 may precode the signal including the at least two reference symbols for the single-layer transmission corresponding to the at least two antenna ports using at least two precoding vectors of a precoding matrix, where a first precoding vector of the precoding matrix is associated with the first reference symbol and a second precoding vector of the precoding matrix is associated with a second reference symbol. In some examples, the precoder component 610 may perform a hybrid precoding operation on the at least two power amplifiers in an analog domain, where estimating the nonlinearity model of the at least two power amplifiers is based on the hybrid precoding operation on the at least two power amplifiers in the analog domain. In some cases, the wideband precoding operation is based on a phase.

The estimation component 615 may estimate, based on the at least two reference symbols, a nonlinearity model of at least two power amplifiers associated with the single-layer transmission. In some examples, the estimation component 615 may determine an estimate of a nonlinearity factor of the precoded signal based on the estimated nonlinearity model. In some examples, the estimation component 615 may estimate, based on the at least two reference symbols, a nonlinearity model of at least two power amplifiers associated with the single-layer transmission. In some examples, the estimation component 615 may determine an estimate of a nonlinearity factor of the precoded signal based on the estimated nonlinearity model. In some examples, estimating one or more data symbols associated with the first reference symbol, where determining the nonlinearity model includes determining the nonlinearity model of the at least two power amplifiers associated with the single-layer transmission corresponding to the at least two antenna ports based at least in part on the estimated one or more data symbols associated with the first reference symbol. In some examples, estimating an input to each of the at least two power amplifiers based on the precoded signal and the estimated one or more data symbols associated with the first reference symbol, where determining the nonlinearity model includes determining the nonlinearity model of the at least two power amplifiers associated with the single-layer transmission corresponding to the at least two antenna ports based at least in part on the estimated input to each of the at least two power amplifiers.

In some examples, estimating a channel impulse response based on the estimated input to each of the at least two power amplifiers, where determining the estimate of the nonlinearity factor includes determining the estimate of the nonlinearity factor of the precoded signal at a receiver based at least in part on the estimated nonlinearity model of the at least two power amplifiers and the estimated channel impulse response. In some examples, estimating a channel impulse response associated with the at least two power amplifiers based on the at least two precoded reference symbols, where determining the estimate of the nonlinearity factor of the precoded signal includes determining the estimate of the nonlinear factor of the precoded signal based at least in part on the estimated channel impulse response. In some cases, estimating a channel impulse response associated with the at least two power amplifiers based on the at least two precoded reference symbols, where determining the estimate of the nonlinearity factor of the precoded signal includes: determining the estimate of the nonlinear factor of the precoded signal based on the estimated channel impulse response.

The signal component 620 may communicate the precoded signal based on the determined estimate of the nonlinearity factor of the precoded signal. In some examples, the signal component 620 may receive a precoded signal including at least two reference symbols associated with a single-layer transmission using at least two antenna ports, where at least a first reference symbol of the two reference symbols is associated with at least one data symbol of a data stream. In some examples, the signal component 620 may decode the precoded signal based on the determined estimate of the nonlinearity factor of the precoded signal. In some cases, the precoded signal corresponds to a codebook-based uplink transmission. In some cases, the precoded signal corresponds to a noncodebook-based uplink transmission.

The message component 625 may transmit a DCI message including an indication to include a second reference symbol based on the single-layer transmission corresponding to the at least two antenna ports. In some examples, the message component 625 may transmit an RRC configuration message including an indication to include a second reference symbol based on the single-layer transmission corresponding to the at least two antenna ports, where the indication corresponds to a transmitted precoding matrix indicator index. In some examples, the message component 625 may receive a DCI message including an indication to include a second reference symbol based on the single-layer transmission corresponding to the at least two antenna ports. In some examples, the message component 625 may receive an RRC configuration message including an indication to include a second reference symbol based on the single-layer transmission corresponding to the at least two antenna ports, where the indication corresponds to a transmitted precoding matrix indicator index. In some cases, the indication is a bit indication. In some cases, the indication corresponds to a TPMI index.

The symbol component 630 may determine to use a second reference symbol for the single-layer transmission corresponding to the at least two antenna ports based on a codebook table. In some cases, a second reference symbol of the at least two reference symbols correspond to a second directional beam orthogonal to a first directional beam associated with a signaled transmitted precoding matrix indicator. In some cases, a number of reference symbols corresponds to a number of antenna ports for the single-layer transmission. In some cases, a second reference symbol of the at least two reference symbols is an extra reference symbol. In some cases, the at least two reference symbols include a DMRS. In some cases, the first reference symbol of the at least two reference symbols includes a DMRS and a second reference symbol of the at least two reference symbols includes a virtual DMRS. In some cases, at least a second reference symbol of the two reference symbols includes no data. The factor component 635 may adjust the nonlinear factor of the precoded signal based on the estimated nonlinearity model of the at least two power amplifiers and the estimated channel impulse response, where adjusting the nonlinear factor of the precoded signal includes.

Figure 7:
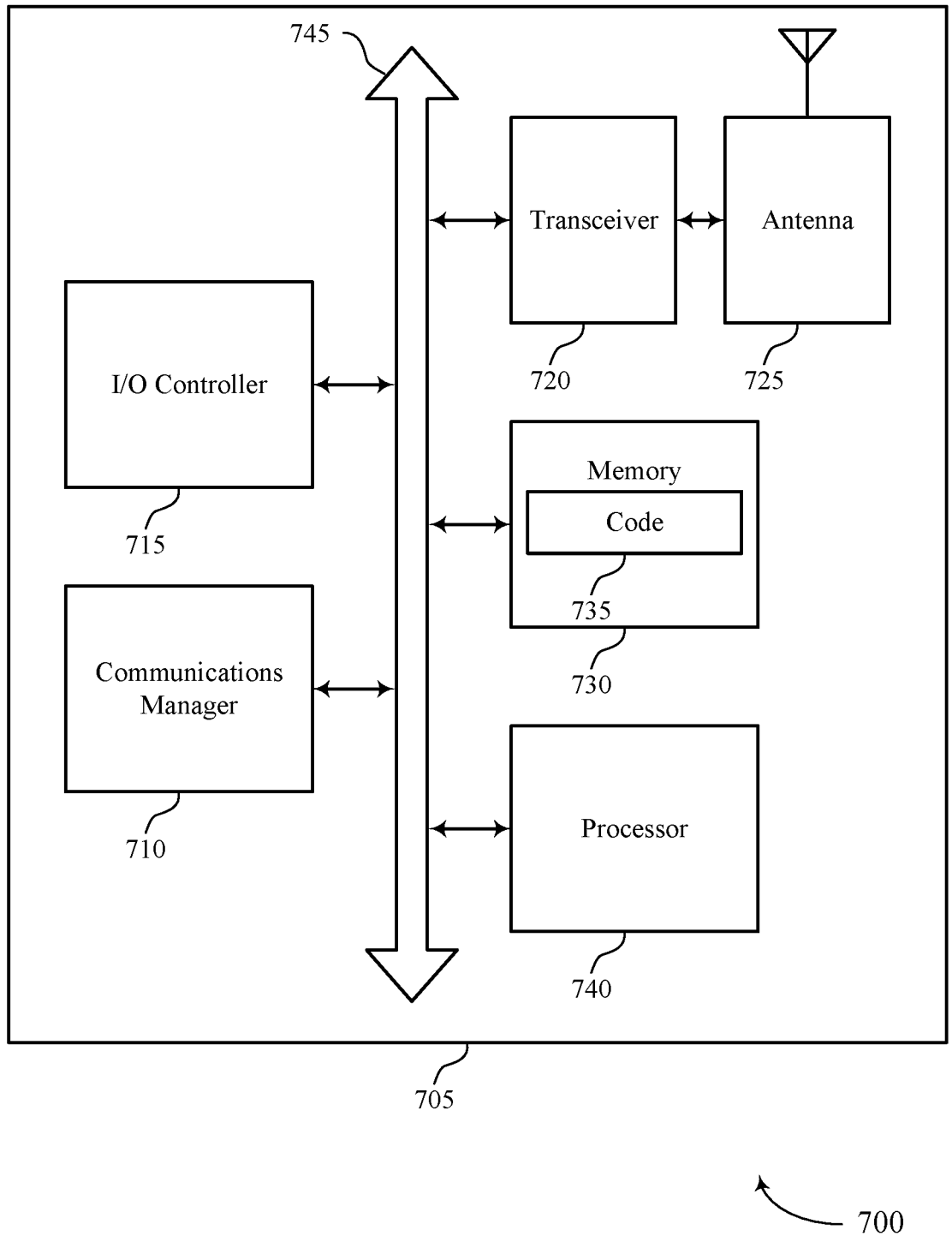
FIG. 7 shows a diagram of a system including a device that supports techniques for processing digital post distortion using additional reference symbols in accordance with various aspects of the present disclosure.

FIG. 7 shows a diagram of a system 700 including a device 705 that supports techniques for processing digital post distortion using additional reference symbols in accordance with various aspects of the present disclosure. The device 705 may be an example of or include the components of device 405, device 505, or a device as described herein. For example, the device 705 may be a receiver device or a transmitter device, or both. The device 705 may include components for bi-directional voice and data communications including components for transmitting and receiving communications, including a communications manager 710, an I/O controller 715, a transceiver 720, an antenna 725, memory 730, a processor 740, and a coding manager 750. These components may be in electronic communication via one or more buses (e.g., bus 745).

At least one implementation may enable the communications manager 710 to process digital post distortion using additional references symbols. The communications manager 710 may thus add an additional reference symbol (or pilot) in an uplink or a downlink to extract a channel between each transmit port and a receive port. Without the additional reference symbol (or pilot), the communications manager 710 may be unable to perform the digital post distortion processing with single layer, unless the communications manager 710 uses a single transmit port (i.e., without digital precoding). Based on implementing the digital post distortion processing using additional references symbols as described herein, one or more processors of the device 705 (e.g., processor(s) controlling or incorporated with the communications manager 710) may experience reduce power consumption and promote high reliability and low latency wireless communications, among other benefits.

The communications manager 710 may precode a signal including at least two reference symbols for a single-layer transmission using at least two antenna ports, where at least a first reference symbol of the at least two reference symbols is associated with at least one data symbol of a data stream. The communications manager 710 may estimate, based on the at least two reference symbols, a nonlinearity model of at least two power amplifiers associated with the single-layer transmission. The communications manager 710 may determine an estimate of a nonlinearity factor of the precoded signal based on the estimated nonlinearity model, and communicate the precoded signal based on the determined estimate of the nonlinearity factor of the precoded signal.

The communications manager 710 may also receive a precoded signal including at least two reference symbols associated with a single-layer transmission using at least two antenna ports, where at least a first reference symbol of the two reference symbols is associated with at least one data symbol of a data stream. The communications manager 710 may estimate, based on the at least two reference symbols, a nonlinearity model of at least two power amplifiers associated with the single-layer transmission, and determine an estimate of a nonlinearity factor of the precoded signal based on the estimated nonlinearity model. The communications manager 710 may decode the precoded signal based on the determined estimate of the nonlinearity factor of the precoded signal.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the device 705 may include a single antenna 725. However, in some cases, the device 705 may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor 740 to perform various functions described herein. In some cases, the memory 730 may contain, among other things, a BIOS which may control basic hardware or software operation such as the interaction with peripheral components or devices. The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for processing digital post distortion using additional reference symbols).

Figure 8:
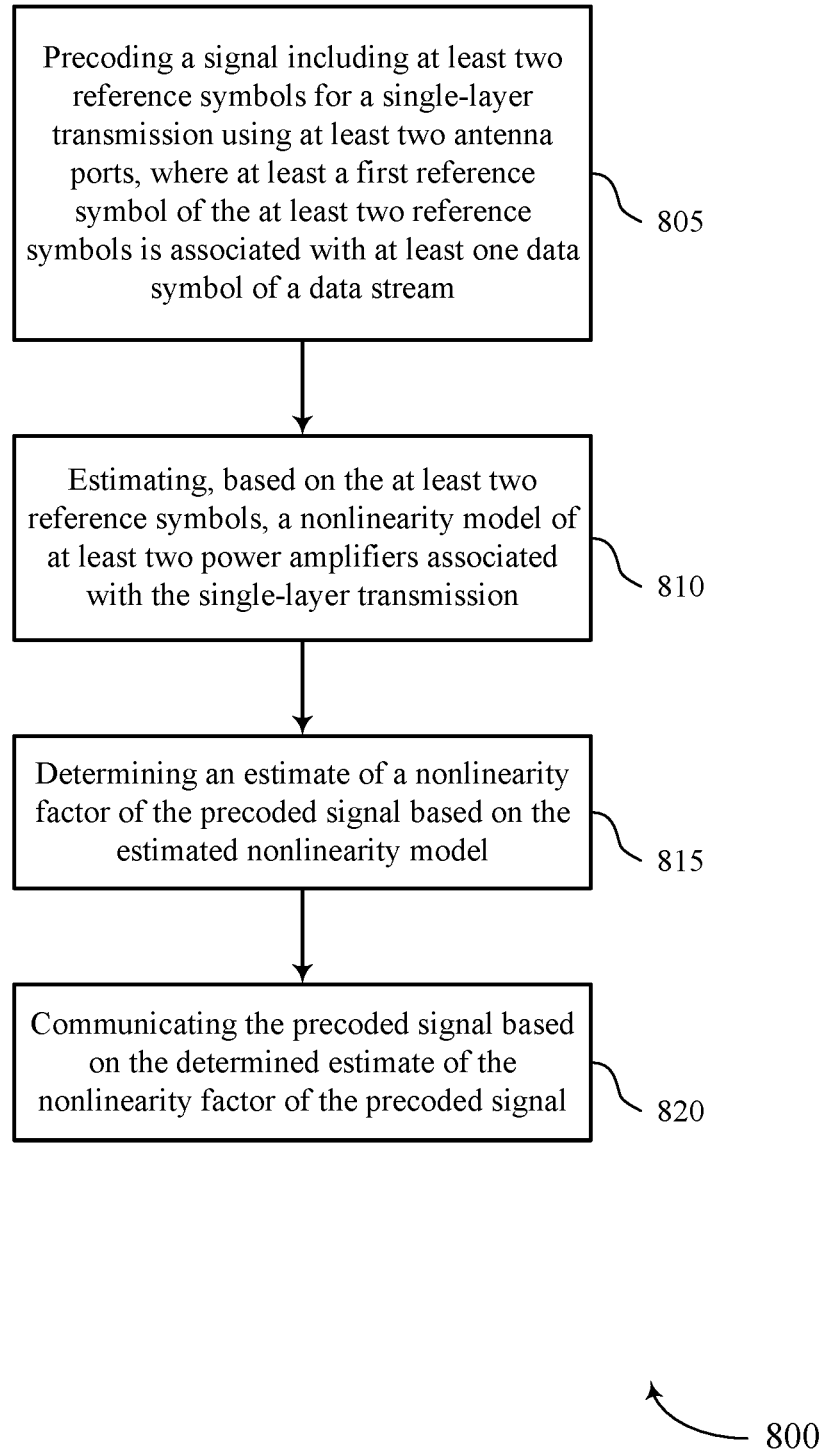
FIGS. 8 through 11 show flowcharts illustrating methods that support techniques for processing digital post distortion using additional reference symbols in accordance with various aspects of the present disclosure.

FIG. 8 shows a flowchart illustrating a method 800 that supports techniques for processing digital post distortion using additional reference symbols in accordance with various aspects of the present disclosure. The operations of method 800 may be implemented by a device or its components as described herein. For example, the operations of method 800 may be performed by a communications manager as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 805, the device may precode a signal including at least two reference symbols for a single-layer transmission using at least two antenna ports, where at least a first reference symbol of the at least two reference symbols is associated with at least one data symbol of a data stream. The operations of 805 may be performed according to the methods described herein. In some examples, aspects of the operations of 805 may be performed by a precoder component as described with reference to FIGS. 4 through 7.

At 810, the device may estimate, based on the at least two reference symbols, a nonlinearity model of at least two power amplifiers associated with the single-layer transmission. The operations of 810 may be performed according to the methods described herein. In some examples, aspects of the operations of 810 may be performed by an estimation component as described with reference to FIGS. 4 through 7.

At 815, the device may determine an estimate of a nonlinearity factor of the precoded signal based on the estimated nonlinearity model. The operations of 815 may be performed according to the methods described herein. In some examples, aspects of the operations of 815 may be performed by an estimation component as described with reference to FIGS. 4 through 7.

At 820, the device may communicate the precoded signal based on the determined estimate of the nonlinearity factor of the precoded signal. The operations of 820 may be performed according to the methods described herein. In some examples, aspects of the operations of 820 may be performed by a signal component as described with reference to FIGS. 4 through 7.

Figure 9:
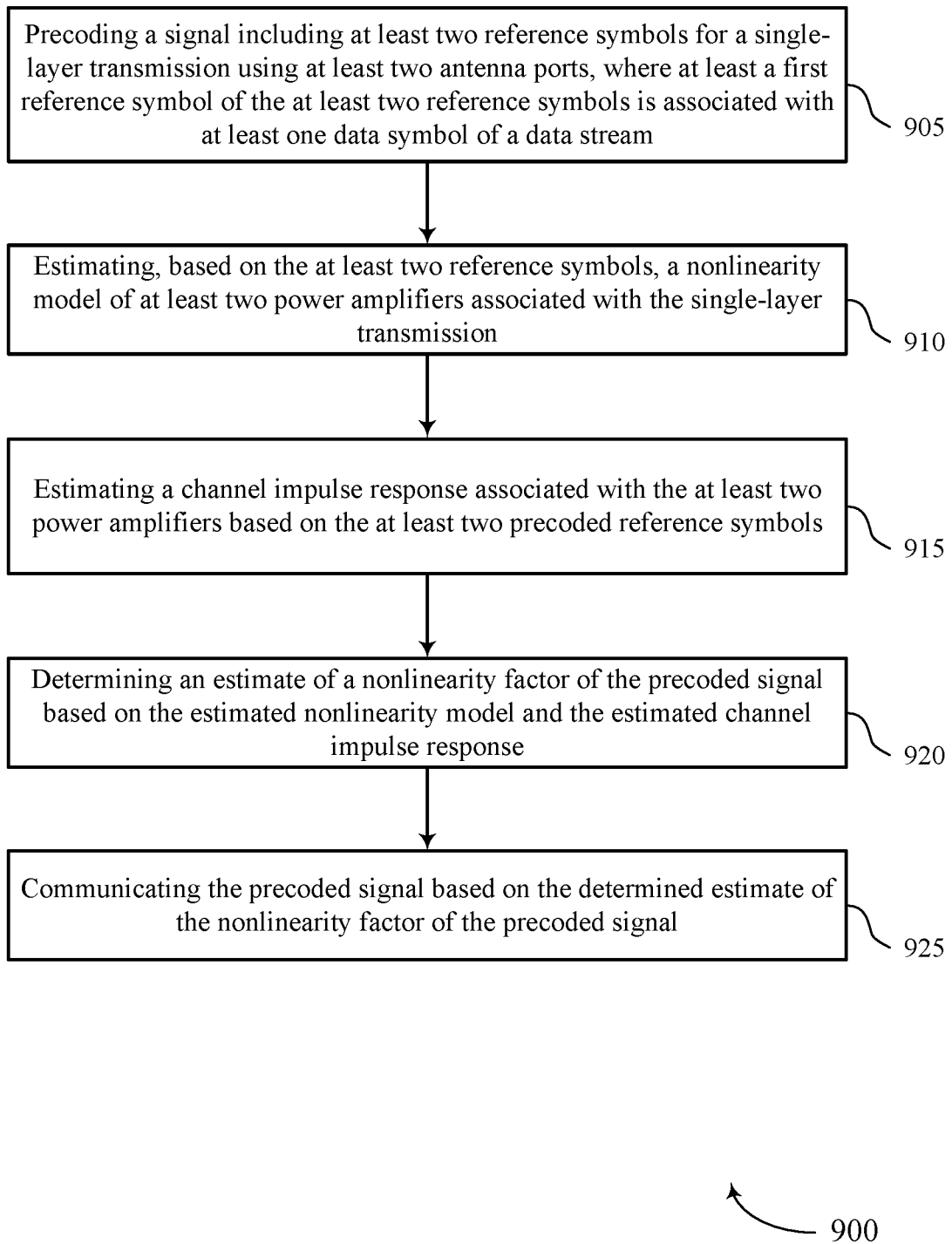

FIG. 9 shows a flowchart illustrating a method 900 that supports techniques for processing digital post distortion using additional reference symbols in accordance with various aspects of the present disclosure. The operations of method 900 may be implemented by a device or its components as described herein. For example, the operations of method 900 may be performed by a communications manager as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 905, the device may precode a signal including at least two reference symbols for a single-layer transmission using at least two antenna ports, where at least a first reference symbol of the at least two reference symbols is associated with at least one data symbol of a data stream. The operations of 905 may be performed according to the methods described herein. In some examples, aspects of the operations of 905 may be performed by a precoder component as described with reference to FIGS. 4 through 7.

At 910, the device may estimate, based on the at least two reference symbols, a nonlinearity model of at least two power amplifiers associated with the single-layer transmission. The operations of 910 may be performed according to the methods described herein. In some examples, aspects of the operations of 910 may be performed by an estimation component as described with reference to FIGS. 4 through 7.

At 915, the device may estimate a channel impulse response associated with the at least two power amplifiers based on the at least two precoded reference symbols. The operations of 915 may be performed according to the methods described herein. In some examples, aspects of the operations of 915 may be performed by an estimation component as described with reference to FIGS. 4 through 7.

At 920, the device may determine an estimate of a nonlinearity factor of the precoded signal based on the estimated nonlinearity model and the estimated channel impulse response. The operations of 920 may be performed according to the methods described herein. In some examples, aspects of the operations of 920 may be performed by an estimation component as described with reference to FIGS. 4 through 7.

At 925, the device may communicate the precoded signal based on the determined estimate of the nonlinearity factor of the precoded signal. The operations of 925 may be performed according to the methods described herein. In some examples, aspects of the operations of 925 may be performed by a signal component as described with reference to FIGS. 4 through 7.

Figure 10:
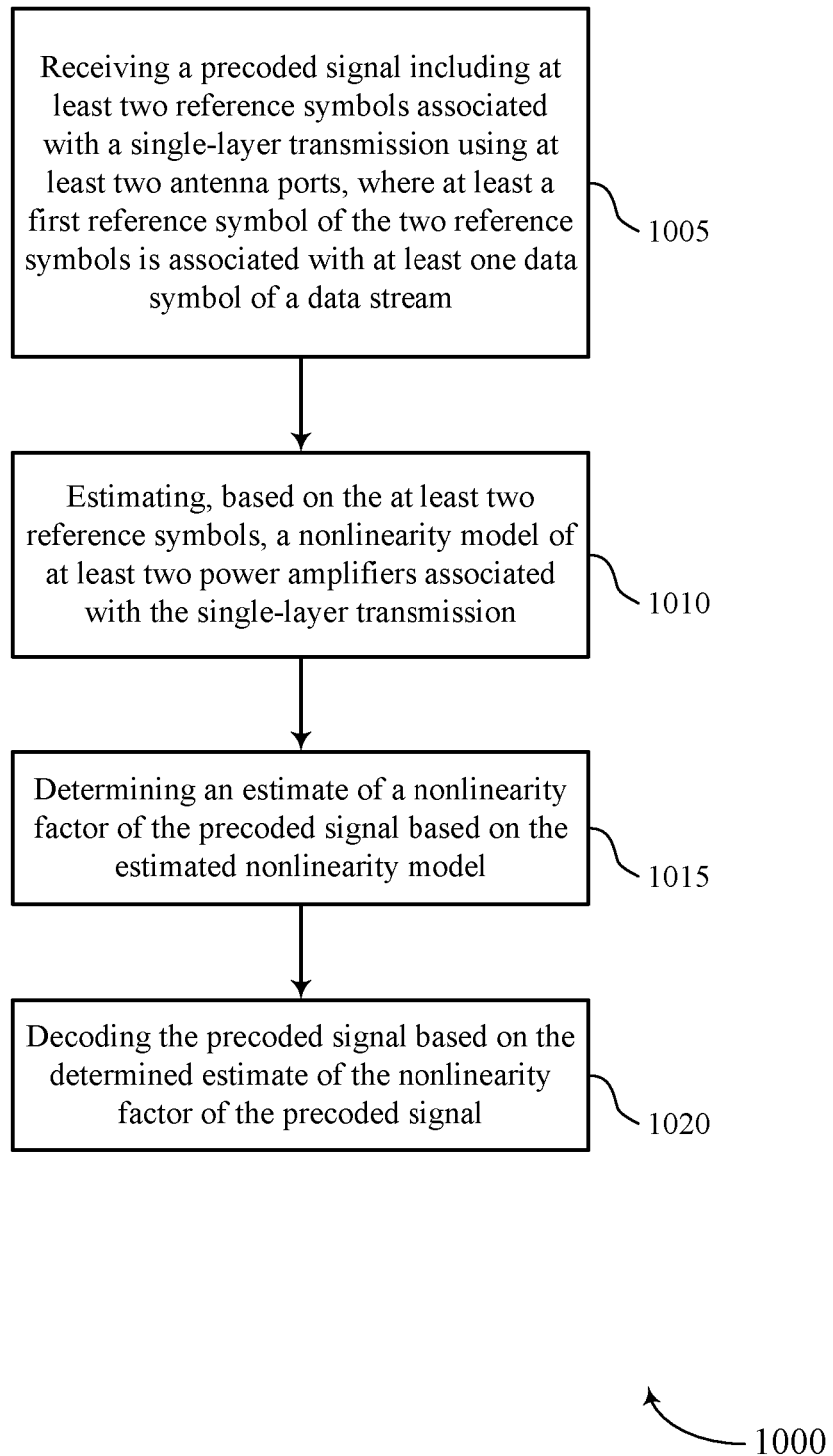

FIG. 10 shows a flowchart illustrating a method 1000 that supports techniques for processing digital post distortion using additional reference symbols in accordance with various aspects of the present disclosure. The operations of method 1000 may be implemented by a device or its components as described herein. For example, the operations of method 1000 may be performed by a communications manager as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 1005, the device may receive a precoded signal including at least two reference symbols associated with a single-layer transmission using at least two antenna ports, where at least a first reference symbol of the two reference symbols is associated with at least one data symbol of a data stream. The operations of 1005 may be performed according to the methods described herein. In some examples, aspects of the operations of 1005 may be performed by a signal component as described with reference to FIGS. 4 through 7.

At 1010, the device may estimate, based on the at least two reference symbols, a nonlinearity model of at least two power amplifiers associated with the single-layer transmission. The operations of 1010 may be performed according to the methods described herein. In some examples, aspects of the operations of 1010 may be performed by an estimation component as described with reference to FIGS. 4 through 7.

At 1015, the device may determine an estimate of a nonlinearity factor of the precoded signal based on the estimated nonlinearity model. The operations of 1015 may be performed according to the methods described herein. In some examples, aspects of the operations of 1015 may be performed by an estimation component as described with reference to FIGS. 4 through 7.

At 1020, the device may decode the precoded signal based on the determined estimate of the nonlinearity factor of the precoded signal. The operations of 1020 may be performed according to the methods described herein. In some examples, aspects of the operations of 1020 may be performed by a signal component as described with reference to FIGS. 4 through 7.

Figure 11:
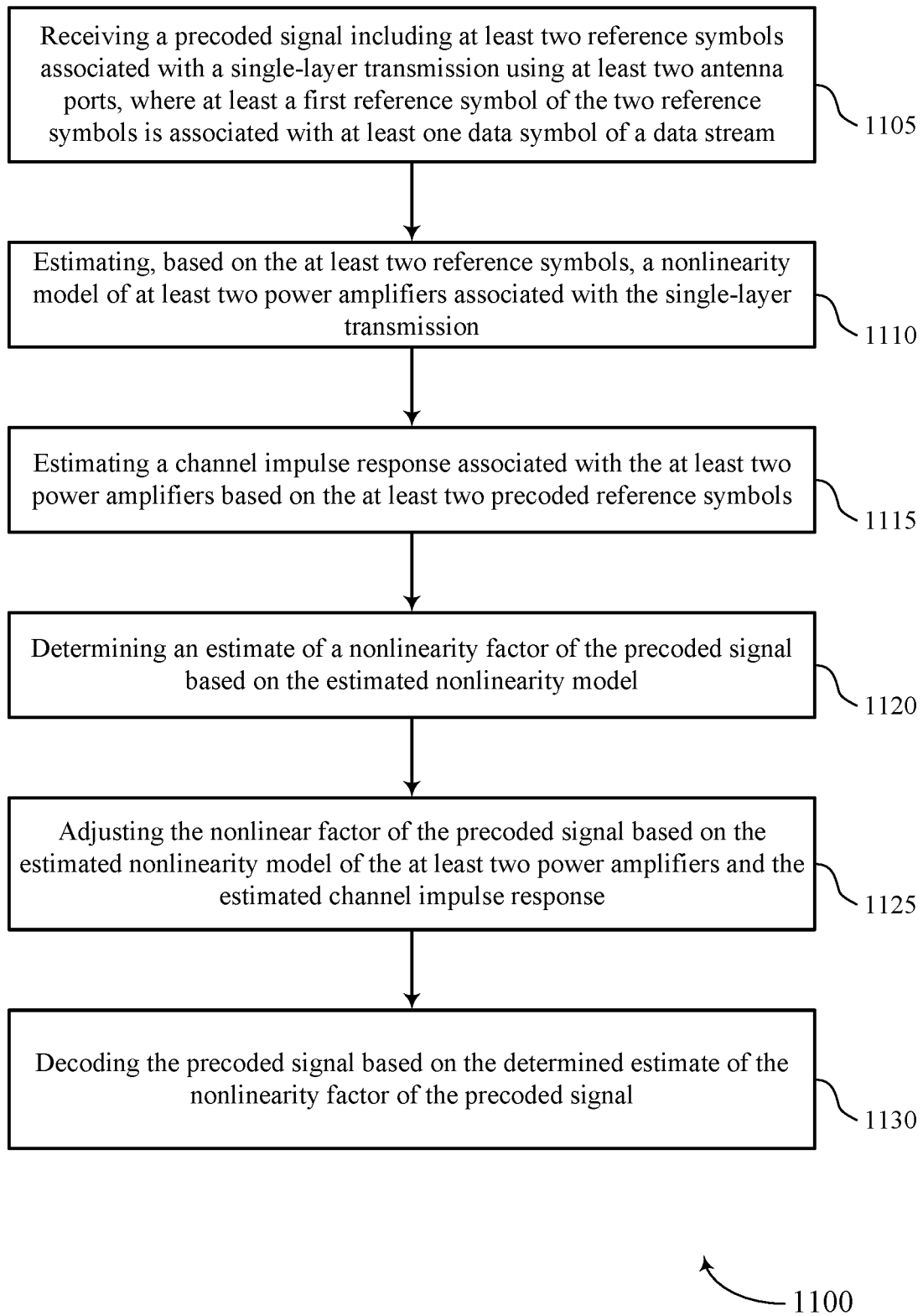

FIG. 11 shows a flowchart illustrating a method 1100 that supports techniques for processing digital post distortion using additional reference symbols in accordance with various aspects of the present disclosure. The operations of method 1100 may be implemented by a device or its components as described herein. For example, the operations of method 1100 may be performed by a communications manager as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 1105, the device may receive a precoded signal including at least two reference symbols associated with a single-layer transmission using at least two antenna ports, where at least a first reference symbol of the two reference symbols is associated with at least one data symbol of a data stream. The operations of 1105 may be performed according to the methods described herein. In some examples, aspects of the operations of 1105 may be performed by a signal component as described with reference to FIGS. 4 through 7.

At 1110, the device may estimate, based on the at least two reference symbols, a nonlinearity model of at least two power amplifiers associated with the single-layer transmission. The operations of 1110 may be performed according to the methods described herein. In some examples, aspects of the operations of 1110 may be performed by an estimation component as described with reference to FIGS. 4 through 7.

At 1115, the device may estimate a channel impulse response associated with the at least two power amplifiers based on the at least two precoded reference symbols. The operations of 1115 may be performed according to the methods described herein. In some examples, aspects of the operations of 1115 may be performed by an estimation component as described with reference to FIGS. 4 through 7.

At 1120, the device may determine an estimate of a nonlinearity factor of the precoded signal based on the estimated nonlinearity model. The operations of 1120 may be performed according to the methods described herein. In some examples, aspects of the operations of 1120 may be performed by an estimation component as described with reference to FIGS. 4 through 7.

At 1125, the device may adjust the nonlinear factor of the precoded signal based on the estimated nonlinearity model of the at least two power amplifiers and the estimated channel impulse response. The operations of 1125 may be performed according to the methods described herein. In some examples, aspects of the operations of 1125 may be performed by a factor component as described with reference to FIGS. 4 through 7.

At 1130, the device may decode the precoded signal based on the determined estimate of the nonlinearity factor of the precoded signal. The operations of 1130 may be performed according to the methods described herein. In some examples, aspects of the operations of 1130 may be performed by a signal component as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
a memory; and
at least one processor coupled to the memory, wherein the at least one processor is configured to:
precode a signal including at least two reference symbols for a single-layer transmission using at least two antenna ports, wherein at least a first reference symbol of the at least two reference symbols is associated with at least one data symbol;
estimate, based on the at least two reference symbols, a nonlinearity model of at least two power amplifiers associated with the single-layer transmission;
determine an estimate of a nonlinearity factor of the precoded signal based at least in part on the estimated nonlinearity model; and
communicate the precoded signal based on the determined estimate of the nonlinearity factor of the precoded signal.

2. The apparatus of claim 1, wherein the at least one processor is configured to:
estimate a channel impulse response associated with the at least two power amplifiers based on the at least two reference symbols, wherein, to determine the estimate of the nonlinearity factor of the precoded signal, the at least one processor is configured to:
determine the estimate of the nonlinear factor of the precoded signal based on the estimated channel impulse response.

3. The apparatus of claim 2, wherein the at least one processor is configured to:
determine a precoding matrix, wherein, to precode the signal, the at least one processor is configured to:
precode the signal including the at least two reference symbols for the single-layer transmission corresponding to the at least two antenna ports using the precoding matrix, wherein at least one of:
to estimate the nonlinearity model, the at least one processor is configured to estimate the nonlinearity model based on the at least two reference symbols and the precoding matrix; or
to estimate the channel impulse response, the at least one processor is configured to estimate the channel impulse response based on the at least two reference symbols and the precoding matrix.

4. The apparatus of claim 1, wherein the at least one processor is configured to:
estimate one or more data symbols associated with the first reference symbol, wherein, to determine the nonlinearity model, the at least one processor is configured to:
determine the nonlinearity model of the at least two power amplifiers associated with the single-layer transmission corresponding to the at least two antenna ports based on the estimated one or more data symbols associated with the first reference symbol.

5. The apparatus of claim 4, wherein the at least one processor is configured to:
estimate a respective input to each respective power amplifier of the at least two power amplifiers based on the precoded signal and the estimated one or more data symbols associated with the first reference symbol, wherein, to determine the nonlinearity model, the at least one processor is configured to:
determine the nonlinearity model of the at least two power amplifiers associated with the single-layer transmission corresponding to the at least two antenna ports based on each respective estimated input to each respective power amplifier of the at least two power amplifiers.

6. The apparatus of claim 5, wherein the at least one processor is configured to further comprising:
estimate a channel impulse response based on each respective estimated input to each respective power amplifier of the at least two power amplifiers, wherein, to determine the estimate of the nonlinearity factor, the at least one processor is configured to :
determine the estimate of the nonlinearity factor of the precoded signal at a receiver based on the estimated nonlinearity model of the at least two power amplifiers and the estimated channel impulse response.

7. The apparatus of claim 1, wherein, to precode the signal, the at least one processor is configured to:
precode the signal using a wideband precoding operation resulting in the first reference symbol of the at least two reference symbols corresponding to a first orthogonal sequence and a second reference symbol of the at least two reference symbols corresponding to a second orthogonal sequence different from the first orthogonal sequence.

8. The apparatus of claim 7, wherein the wideband precoding operation is based on a phase.

9. The apparatus of claim 1, wherein, to precode the signal, the at least one processor is configured to :
precode the signal including the at least two reference symbols for the single-layer transmission corresponding to the at least two antenna ports using at least two precoding vectors of a precoding matrix, wherein a first precoding vector of the precoding matrix is associated with the first reference symbol and a second precoding vector of the precoding matrix is associated with a second reference symbol.

10. The apparatus of claim 1, wherein the at least one processor is configured to:
transmit downlink control information comprising an indication to include a second reference symbol based on the single-layer transmission corresponding to the at least two antenna ports.

11. The apparatus of claim 10, wherein the indication is a bit indication.

12. The apparatus of claim 10, wherein the indication corresponds to a precoding matrix indicator index.

13. The apparatus of claim 1, wherein the at least one processor is configured to:
transmit a radio resource control configuration information comprising an indication to include a second reference symbol based on the single-layer transmission corresponding to the at least two antenna ports, wherein the indication corresponds to a precoding matrix indicator index.

14. The apparatus of claim 1, wherein the at least one processor is configured to:
perform a hybrid precoding operation on the at least two power amplifiers in an analog domain, wherein, to estimate the nonlinearity model of the at least two power amplifiers, the at least one processor is configured to estimate the nonlinearity model of the at least two power amplifiers based on the hybrid precoding operation on the at least two power amplifiers in the analog domain.

15. The apparatus of claim 1, wherein the at least one processor is configured to:
determine to use a second reference symbol for the single-layer transmission corresponding to the at least two antenna ports based on a codebook table.

16. The apparatus of claim 1, wherein a second reference symbol of the at least two reference symbols corresponds to a second directional beam orthogonal to a first directional beam associated with precoding matrix indicator.

17. The apparatus of claim 1, wherein the precoded signal corresponds to a codebook-based uplink transmission.

18. The apparatus of claim 1, wherein the precoded signal corresponds to a noncodebook-based uplink transmission.

19. The apparatus of claim 1, wherein a number of reference symbols corresponds to a number of antenna ports for the single-layer transmission.

20. The apparatus of claim 1, wherein a second reference symbol of the at least two reference symbols is an additional reference symbol, and wherein the additional reference symbol comprises an additional pilot symbol to estimate the nonlinearity model.

21. The apparatus of claim 1, wherein the at least two reference symbols include a demodulation reference symbol.

22. The apparatus of claim 1, wherein the first reference symbol of the at least two reference symbols includes a demodulation reference symbol and a second reference symbol of the at least two reference symbols includes a virtual demodulation reference symbol.

23. The apparatus of claim 1, wherein at least a second reference symbol of the two reference symbols excludes data.

24. An apparatus for wireless communication, comprising:
a memory; and
at least one processor coupled to the memory, wherein the at least one processor is configured to:
receive a precoded signal including at least two reference symbols associated with a single-layer transmission using at least two antenna ports, wherein at least a first reference symbol of the two reference symbols is associated with at least one data symbol;
estimate, based on the at least two reference symbols, a nonlinearity model of at least two power amplifiers associated with the single-layer transmission;
determine an estimate of a nonlinearity factor of the precoded signal based at least in part on the estimated nonlinearity model; and
decode the precoded signal based on the determined estimate of the nonlinearity factor of the precoded signal.

25. The apparatus of claim 24, wherein the at least one processor is configured to:
estimate a channel impulse response associated with the at least two power amplifiers based on the at least two reference symbols, wherein, to determine the estimate of the nonlinearity factor of the precoded signal, the at least one processor is configured to:
determine the estimate of the nonlinear factor of the precoded signal based on the estimated channel impulse response.

26. The apparatus of claim 25, wherein the at least one processor is configured to:
adjust the nonlinear factor of the precoded signal based on the estimated nonlinearity model of the at least two power amplifiers and the estimated channel impulse response, wherein, to adjust the nonlinear factor of the precoded signal, the at least one processor is configured to:
cancel, at the apparatus, the nonlinear factor of the precoded signal.

27. The method of claim 24, wherein the at least one processor is configured to:
receive downlink control information comprising an indication to include a second reference symbol based on the single-layer transmission corresponding to the at least two antenna ports.

28. The apparatus of claim 27, wherein the indication is a bit indication.

29. The apparatus of claim 27, wherein the indication corresponds to a precoding matrix indicator index.

30. The apparatus of claim 24, wherein the at least one processor is configured to:
receive radio resource control configuration information comprising an indication to include a second reference symbol based on the single-layer transmission corresponding to the at least two antenna ports, wherein the indication corresponds to a precoding matrix indicator index.

31. The apparatus of claim 24, wherein a second reference symbol of the at least two reference symbols corresponds to a second directional beam orthogonal to a first directional beam associated with a precoding matrix indicator.

32. The apparatus of claim 24, wherein the precoded signal corresponds to a codebook-based uplink transmission.

33. The apparatus of claim 24, wherein the precoded signal corresponds to a noncodebook-based uplink transmission.

34. The apparatus of claim 24, wherein a number of reference symbols corresponds to a number of antenna ports for the single-layer transmission.

35. The apparatus of claim 24, wherein a second reference symbol of the at least two reference symbols is an additional reference symbol, and wherein the additional reference symbol comprises an additional pilot symbol to estimate the nonlinearity model.

36. The apparatus of claim 24, wherein the at least two reference symbols include a demodulation reference symbol.

37. The apparatus of claim 24, wherein the first reference symbol of the at least two reference symbols includes a demodulation reference symbol and a second reference symbol of the at least two reference symbols includes a virtual demodulation reference symbol.

38. The apparatus of claim 24, wherein at least a second reference symbol of the two reference symbols excludes data.

39. A method for wireless communication, comprising:
precoding a signal including at least two reference symbols for a single-layer transmission using at least two antenna ports, wherein at least a first reference symbol of the at least two reference symbols is associated with at least one data symbol;

estimating, based on the at least two reference symbols, a nonlinearity model of at least two power amplifiers associated with the single-layer transmission;

determining an estimate of a nonlinearity factor of the precoded signal based on the estimated nonlinearity model; and communicating the precoded signal based on the determined estimate of the nonlinearity factor of the precoded signal.

40. A method for wireless communication, comprising:

receiving a precoded signal including at least two reference symbols associated with a single-layer transmission using at least two antenna ports, wherein at least a first reference symbol of the two reference symbols is associated with at least one data symbol;

estimating, based on the at least two reference symbols, a nonlinearity model of at least two power amplifiers associated with the single- layer transmission;

determining an estimate of a nonlinearity factor of the precoded signal based on the estimated nonlinearity model; and decoding the precoded signal based on the determined estimate of the nonlinearity factor of the precoded signal.

41. An apparatus for wireless communication, comprising:

means for precoding a signal including at least two reference symbols for a single-layer transmission using at least two antenna ports, wherein at least a first reference symbol of the at least two reference symbols is associated with at least one data symbol;

means for estimating, based on the at least two reference symbols, a nonlinearity model of at least two power amplifiers associated with the single-layer transmission;

means for determining an estimate of a nonlinearity factor of the precoded signal based on the estimated nonlinearity model; and means for communicating the precoded signal based on the determined estimate of the nonlinearity factor of the precoded signal.

42. An apparatus for wireless communication, comprising:

means for receiving a precoded signal including at least two reference symbols associated with a single-layer transmission using at least two antenna ports, wherein at least a first reference symbol of the two reference symbols is associated with at least one data symbol;

means for estimating, based at least in part on the at least two reference symbols, a nonlinearity model of at least two power amplifiers associated with the single-layer transmission;

means for determining an estimate of a nonlinearity factor of the precoded signal based on the estimated nonlinearity model; and means for decoding the precoded signal based on the determined estimate of the nonlinearity factor of the precoded signal.

43. A non-transitory computer-readable medium having storing code for wireless communication stored thereon that, when executed by a device, causes the device to:

precode a signal including at least two reference symbols for a single-layer transmission using at least two antenna ports, wherein at least a first reference symbol of the at least two reference symbols is associated with at least one data symbol;

estimate, based on the at least two reference symbols, a nonlinearity model of at least two power amplifiers associated with the single-layer transmission;

determine an estimate of a nonlinearity factor of the precoded signal based on the estimated nonlinearity model; and communicate the precoded signal based on the determined estimate of the nonlinearity factor of the precoded signal.

44. A non-transitory computer-readable medium code for wireless communication stored thereon that, when executed by a device, causes the device to:

receive a precoded signal including at least two reference symbols associated with a single-layer transmission using at least two antenna ports, wherein at least a first reference symbol of the two reference symbols is associated with at least one data symbol;

estimate, based on the at least two reference symbols, a nonlinearity model of at least two power amplifiers associated with the single-layer transmission;

determine an estimate of a nonlinearity factor of the precoded signal based on the estimated nonlinearity model; and decode the precoded signal based on the determined estimate of the nonlinearity factor of the precoded signal.

* * * * *